(12) United States Patent
Smith et al.

(10) Patent No.: US 12,532,112 B2
(45) Date of Patent: Jan. 20, 2026

(54) ADAPTIVE DIRECTIONAL AUDIO FOR WEARABLE AUDIO DEVICES

(71) Applicant: Axon Enterprise, Inc., Scottsdale, AZ (US)

(72) Inventors: Patrick W. Smith, Scottsdale, AZ (US); Nicholas Gilmour, El Dorado Hills, CA (US); Mark Eastwood, Scottsdale, CA (US); Vitaly Bulgarov, Las Vegas, NV (US); Brian Fairbanks, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 130 days.

(21) Appl. No.: 18/010,442

(22) PCT Filed: Jun. 15, 2021

(86) PCT No.: PCT/US2021/037505
§ 371 (c)(1),
(2) Date: Dec. 14, 2022

(87) PCT Pub. No.: WO2021/257620
PCT Pub. Date: Dec. 23, 2021

(65) Prior Publication Data
US 2023/0254642 A1    Aug. 10, 2023

Related U.S. Application Data

(60) Provisional application No. 63/039,458, filed on Jun. 15, 2020.

(51) Int. Cl.
*H04R 3/12* (2006.01)
*H04N 23/51* (2023.01)
(Continued)

(52) U.S. Cl.
CPC ............ *H04R 3/12* (2013.01); *H04N 23/51* (2023.01); *H04R 1/028* (2013.01); *H04R 1/04* (2013.01);
(Continued)

(58) Field of Classification Search
CPC ........ H04R 1/406; H04R 1/403; H04R 1/323; H04R 1/04; H04R 1/028; H04R 3/12;
(Continued)

(56) References Cited

U.S. PATENT DOCUMENTS

| 7,587,227 B2 | 9/2009 | Cheung et al. |
| 8,934,654 B2 | 1/2015 | Fullman |

(Continued)

FOREIGN PATENT DOCUMENTS

| JP | 2013191996 A | 9/2013 |
| KR | 101471084 B1 | 12/2014 |

(Continued)

OTHER PUBLICATIONS

Korean Intellectual Property Office, International Search Report for International Patent Application No. PCT/US21/37505 mailed Oct. 6, 2021.

*Primary Examiner* — Tsion B Owens
(74) *Attorney, Agent, or Firm* — Andrew Graham

(57) ABSTRACT

A wearable audio device may comprise a first directional loudspeaker having a first directionality, a second directional loudspeaker having a second directionality different from the first directionality, a communication interface configured to receive a communication audio signal, and a processor configured to operatively control the first directional loudspeaker, the second directional loudspeaker, and the communication interface. The processor may be configured to perform operations comprising detecting a relative mount position of wearable communication device, selecting a (Continued)

proximal loudspeaker to emit the communication audio signal in accordance with the relative mount position, wherein the proximal loudspeaker comprises one of the first directional loudspeaker and the second directional loudspeaker; and transferring the communication audio signal from the communication interface to the proximal loudspeaker in accordance with the selecting.

20 Claims, 5 Drawing Sheets

(51) Int. Cl.
*H04R 1/02* (2006.01)
*H04R 1/04* (2006.01)
*H04R 1/40* (2006.01)
*H04R 3/00* (2006.01)

(52) U.S. Cl.
CPC ............ *H04R 1/403* (2013.01); *H04R 1/406* (2013.01); *H04R 3/005* (2013.01); *H04R 2201/401* (2013.01)

(58) Field of Classification Search
CPC .... H04R 29/001; H04R 3/005; H04R 29/007; H04R 2201/401; H04R 2420/07; H04N 23/51
See application file for complete search history.

(56) References Cited

U.S. PATENT DOCUMENTS

| | | | |
|---|---|---|---|
| 9,232,366 | B1 | 1/2016 | Charlier et al. |
| 9,271,068 | B2 | 2/2016 | Singhal |
| 9,445,175 | B2 | 9/2016 | Seo et al. |
| 9,794,683 | B2 | 10/2017 | Kim |
| 10,575,093 | B2 | 2/2020 | Baym et al. |
| 10,602,253 | B2 | 3/2020 | Litovsky et al. |
| 11,080,009 | B1 | 8/2021 | Shah |
| 11,586,414 | B2 * | 2/2023 | Shah ................. G06F 3/165 |
| 11,950,017 | B2 * | 4/2024 | Han ................. H04N 23/60 |
| 2011/0226123 | A1 * | 9/2011 | Priebe ................. F41H 5/08 89/36.02 |
| 2014/0270321 | A1 * | 9/2014 | Fullam ................. H04R 3/12 381/387 |
| 2017/0142509 | A1 * | 5/2017 | Hyatt ................. H04R 29/001 |
| 2018/0234674 | A1 * | 8/2018 | Smith ................. H04N 23/698 |
| 2019/0028817 | A1 * | 1/2019 | Gabai ................. H04R 25/407 |
| 2019/0268550 | A1 * | 8/2019 | Arnold ................. A42B 3/042 |
| 2020/0404126 | A1 * | 12/2020 | Jing ................. H04R 5/04 |
| 2024/0163431 | A1 * | 5/2024 | Abe ................. H04N 19/537 |

FOREIGN PATENT DOCUMENTS

| | | |
|---|---|---|
| KR | 101844382 B1 | 4/2018 |
| WO | 2017003958 A1 | 1/2017 |

* cited by examiner

ADAPTIVE DIRECTIONAL AUDIO FOR WEARABLE AUDIO DEVICES

FIELD OF INVENTION

Embodiments of the present invention relate to wearable communication devices comprising adaptive directional audio.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
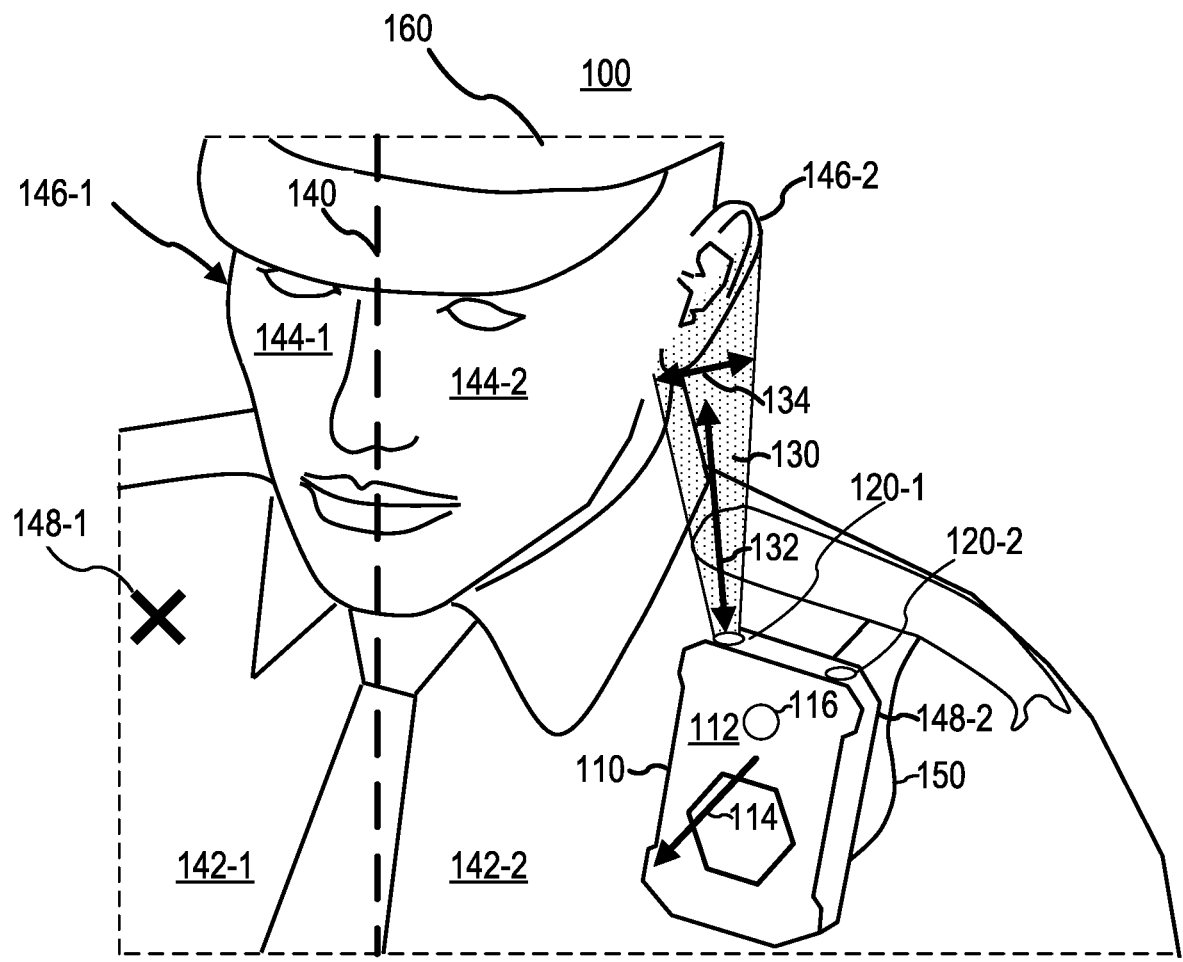
FIG. 1 is a perspective view of an exemplary wearable audio device with adaptive directional audio in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Personnel such as law enforcement officers, first responders, firefighters, and recreationalists use various wearable audio devices at an incident. The wearable audio devices may be configured to provide and/or receive an audio signal for a user. For example, a wearable audio device may comprise a microphone configured to receive an audio signal from a user. The wearable audio device may alternately or additionally comprise a loudspeaker configured to provide (e.g., output, propagate, emit, etc.) an audio signal to the user.

A wearable audio device may be mounted to a user to improve transmission and/or reception of an audio signal. For example, a wearable audio device may be mounted at a position proximate one or more of a head, chest, and/or shoulder of the user. The position may enable an audio signal to be provided directly toward an ear of a user. The position may enable an audio signal to be provided directly from a mouth of a user. By being mounted at the position proximate the head and/or shoulder of the user, the user may speak or hear the audio signal, despite the user being further positioned in a noisy environment. An environment in which the audio signal is transmitted and/or received may comprise one or more environmental audio signals, different from the audio signals, yet the audio signal may still be heard by the user and/or captured by the wearable audio device.

In embodiments, a wearable audio device may include directional transducers configured to provide and/or receive an audio signal in a particular direction. Each directional transducer may be configured to emit or capture the audio signal in the particular direction better (e.g., at a higher amplitude) than another direction relative to the respective directional transducer. The directional transducer may include a directional microphone and/or directional loudspeaker. In accordance with a directivity of the directional transducer, transmission and/or reception of the audio signal may be improved, particularly in a noisy environment. Privacy of the audio signals may also be improved, enabling the audio signal to be communicated between a user and the wearable audio device while decreasing and/or preventing the audio signal from being heard by a nearby user and/or mixed with an environmental audio signal from the nearby user and/or other nearby environmental audio source.

In embodiments, a wearable audio device may include a wearable communication device and an audio signal may include a communication audio signal. The communication audio signal may comprise an audio signal captured and/or provided for output by another communication device. The communication audio signal may comprise an audio signal generated (e.g., spoken) by a user of the wearable communication device and/or a remote user in communication with the wearable audio device via the other communication device. The communication audio signal may be captured by a microphone in one of the wearable communication device and the other communication device. The wearable communication device may be configured to transmit and/or receive the communication audio signal to and/or from the communication device. The other communication device may comprise a local communication device, coupled to the wearable communication device via a short-range wired or wireless communication. For example, the wearable communication device may include a wired or wireless accessory communication device configured to communicate with a nearby land mobile radio, cellular telephone device, or other mobile communication device. In various embodiments, the other communication device may comprise a remote communication device, coupled to the wearable communication device via a long-range wireless communication. For example, the wearable communication device may comprise a mobile communication device such as land mobile radio, cellular telephone device, or other mobile communication device.

In embodiments, a wearable audio device may include a wearable recording device. For example, the wearable audio device may include a wearable audio recording device, wearable video recording device, and/or wearable audiovisual recording device. The wearable recording device may include a wearable camera (e.g., body camera, body-worn camera, etc.) to capture events, so that a video and/or audio record exist of what happened in an incident. In embodiments, the wearable recording device be configured to provide functions enabling communication with a second device. For example, a body-worn camera may include a network interface configured to enable communication with another body-worn camera. Accordingly, the wearable recording device may provide one or more functions of a wearable communication device.

In embodiments, a wearable audio device may be positioned at different positions on a user. For example, a wearable audio device may be positioned at a first relative mount position proximate to a left shoulder of a user. The positions may alternately or additionally include a second relative mount position proximate to a right shoulder of a user. The positions may include one or more lateral positions relative to a midline and/or head of a user. The positions may include relative positions relative to a body part of a user (e.g. head of a user). Statically oriented transducers on a wearable audio device may not be aligned to receive or transmit audio signals for the user at each of the different positions. Accordingly, in embodiments according to various aspects of the present disclosure, and at the different locations, the wearable audio device may provide different directional audio signals.

In various embodiments, a same wearable audio device may be configured to be mounted at the different positions while still oriented in a same direction relative to the user. For example, the wearable audio device may include a reference surface that may is configured to be facing a forward direction of a user at each of a first relative mount position on a first side of a user and a second relative mount position on a second side of the user opposite the first side. In embodiments, the reference surface may include one or more components of an image capturing system (e.g., camera, camera housing, camera lens) and/or one or more components of a mount interface (e.g., post, slot, receptacle, latch, magnet, etc.) configured to physically couple to a recording device. The orientation of the wearable audio device may be limited in a first direction (e.g., forward direction, along a sagittal axis, in an antero-posterior direction), yet adjustable in a second direction (e.g., lateral direction, along a frontal axis, etc.) relative to a user. For a same orientation in the first direction, a same wearable audio device may be positioned at different positions in the second direction while remaining configured for aligned transmission and/or reception of an audio signal according to various aspects of the present disclosure.

In embodiments, a same wearable audio device may be adjustably mounted at the different positions in accordance with user preferences and/or requirements. For example, an officer may choose to mount a body-worn camera at a particular position for a variety of reasons, such as ergonomics, ease of mounting, stability, and/or accessibility. However, such adjustable mounting may preclude a same transducer from effectively providing an audio signal to the user. For example, a forward-facing transducer and/or a transducer configured to transmit or receive an audio signal symmetrically and/or omnidirectionally about the wearable audio device may enable an audio signal to be provided or received from the wearable communication device. However, such a transducer may require the audio signal to be transmitted and/or receive at a higher volume relative to a directional transducer. Such a forward-facing, symmetrical, and/or omni-directional transducer may also decrease privacy of the audio signal relative to a directional transducer. Yet, a directional transducer may have fewer relative positions about a user at which it may effectively receive and/or transmit audio signal. Embodiments according to various aspects of the present disclosure enable a same wearable audio device to be positioned, mounted, or otherwise associated with at different positions (e.g. mount positions, relative mount positions, lateral mount positions) while still enabling the use of directional audio and directional transducers.

In various embodiments, and with reference to FIG. 1, a system 100 for providing adaptive directional audio is disclosed. System 100 may include one or more wearable devices. For example, system 100 may include wearable audio device 110 and wearable mount 150. In combination, wearable audio device 110 and wearable mount 150 enable directional audio to be provided to a user 160 on which system is mounted. In other embodiments, system 100 may comprise a wearable mount that includes at least two transducers and circuitry for transmitting and/or receiving audio signals. The wearable mount in such embodiments may comprise an integrated, non-removeable wearable audio device.

In various embodiments, wearable mount 150 may include one or more features configured to physically couple system 100 to a user. The one or more features may comprise structures that enable mount 150 to physically couple to the user. For example, the one or more features may include one or more of the group comprising elongated portion(s), an inner surface, a curved portion, a reference surface, or a fastener. The fastener may include one or more of a clip, hook, magnet, hook-and-loop material, or other fastener configured to releasably couple the mount to an article of wear. The one or more features may enable wearable mount 150 to be mounted to a side 142 of user 160 (e.g., either first side 142-1 or first side 142-2). The one or more features may enable wearable mount 150 to be mounted to a single side 142 of user 160 (e.g., only first side 142-1 or only first side 142-2). The one or more features may enable wearable mount 150 to be mounted relative to a head of user 160. Via the one or more features, wearable mount 150 may be mounted relative to first side 144-1 of a head of user 160 or second side 144-2 of the head of user 160.

In various embodiments, a side 142 of user 160 and/or a side 144 of a head of user 160 may be determined in accordance with midline 140. Midline 140 may be aligned with a midline of user 160. Midline 140 may comprise an axis. Midline 140 may directionally separate a left side of user 160 from a right side of user 160. For example, first side 142-1 may comprise a right side of user 160 and/or first side 144-1 of the head of user 160 may correspond to a right side of the head of user 160. Second side 142-2 may comprise a left side of user 160 and/or second side 144-2 of the head of user 160 may correspond to a left side of the head of user 160. The left side of user 160 may be disposed to the left of user 160 relative to midline 140 from a perspective of user 160. The right side of user 160 may be disposed to the right of user 160 relative to midline 140 from a perspective of user 160. The one or more features may enable wearable mount 150 to be mounted on either side of midline 140. The one or more features may enable wearable mount 150 to be mounted to a single side 142 of user 160 (e.g., only first side 142-1 or only first side 142-2).

In various embodiments, wearable mount 150 may be configured to be mounted at one or more positions 148 about user 160. The positions may include lateral positions (e.g., lateral mount positions). The lateral positions may be disposed horizontally away from midline 140. The lateral positions may be disposed toward one of two sides 142 of user 160. For example, first position 148-1 may be disposed laterally in first direction from midline 140 and second position 148-2 may be disposed laterally in a second direction from midline 140 different from the first direction. The second direction may be opposite the first direction. First position 148-1 may be disposed laterally from first side 144-1 of the head of user 160 and second position 148-2 may be disposed laterally from second side 144-2 of the head of user 160. Positions 148 may alternately or additionally comprise relative positions (e.g. relative mount positions). The relative positions may be disposed relative to the head of user 160. For example, first position 148-1 may be disposed relative to first side 144-1 of a head of user 160. Second position 148-2 may be disposed relative to second side 144-2 of the head of user 160.

In various embodiments, positions 148 may be associated with a single ear of the ears 146 of user 160. Positions 148 may be associated with the one ear in accordance with the single ear being in direct spatial alignment (e.g., communication, orientation) with the one ear. For example, first position 148-1 may be disposed in spatial alignment with first ear 146-1 and second position 148-2 may be disposed in spatial alignment with second ear 146-2 of user 160. Second ear 146-2 may be occluded (e.g., not spatially aligned) from first position 148-1. First ear 146-1 may be occluded (e.g., not spatially aligned) from second position 148-2. At first position 148-1, an audio signal may not be directly received or provided from second side 144-2 of the head of user 160. At second position 148-2, an audio signal may not be directly received or provided from first side 144-1 of the head of user 160. Accordingly, first ear 146-1 may receive audio from first position 148-1, but audio from second position 148-2 may not be audible at first ear 146-1. Similarly, second ear 146-2 may receive audio from second position 148-2, but audio from first position 148-1 may not be audible at second ear 146-2. In embodiments according to various aspects of the present disclosure, system 100 may provide adaptive directional audio to account for a position of system 100 relative to user 160, enabling audio to be privately and effectively provided independent of the position at which system 100 may be mounted.

In various embodiments, wearable mount 150 may be configured to physically couple to only one side of the sides 144 of user. A geometry (e.g., curvature, shape, etc.) or other property of wearable mount 150 may cause wearable mount 150 be configured to be mounted at the only one side. Wearable mount 150 may be asymmetrical, such that physical coupling with user 160 is possible at one side of an article of wear of user 160 but not at a second side of user 160. For example, wearable mount 150 may be configured to mount to second side 144-2 of user. To mount wearable audio device 110 at first side 144-1, another mount, different from wearable mount 150 may be required for wearable audio device 110. Accordingly, mounting wearable audio device 110 at first position 148-1 may require system 100 to comprise a first mount and mounting wearable audio device 110 at second position 148-2 may require system 100 to comprise mount 150, different from the first mount.

In various embodiments, mount 150 may comprise a mount interface (not shown) configured to couple wearable mount 150 to wearable audio device 110. The mount interface may enable wearable audio device 110 to be selectively decoupled from mount 150. The mount interface may be integrated with a reference surface of the wearable mount 150. The mount interface may be configured to couple with a mount interface of wearable audio device 110. The mount interface may be configured to physically couple to the wearable audio device 150 along a reference direction relative to a reference surface of the wearable mount 150. For example, the mount interface may be configured to physically couple to wearable audio device 110 in a forward direction, upward direction, anterior direction, vertical direction, relative to wearable mount 150. In system 100, wearable audio device 110 is physically coupled to wearable mount 150 in a forward direction relative to wearable mount 150. Wearable audio device 110 may be coupled at a location and orientation from mount 150 in accordance with the mount interface of mount 150. In embodiments, one or more reference directions for system 100 may be defined relative to a position and/or orientation at which system 100 is configured to be mounted on user 160. The one or more reference directions may correspond to reference directions of body of user 160. For example, a forward direction of user 160 may correspond to a forward direction relative to wearable mount 150. As noted above, wearable mount 150 may comprise passive, non-active components or features configured to physically couple wearable audio device 110 to an article of wear (e.g., shirt, jacket, vest, etc.) of user 160.

In various embodiments, wearable audio device 110 may be configured to provide audio between user 160 and wearable audio device 110. Wearable audio device 110 may receive audio spoken by user 160. Wearable audio device 110 may emit audio in the direction of an ear (e.g., left ear 148-1 or right ear 148-2) of user 160. The audio may comprise directional audio. The directional audio may comprise non-omnidirectional audio. The audio may comprise non-ultrasonic audio. The directional audio may comprise human audible frequencies of sound emitted or received by wearable audio device 110. The directional audio may be received or transmitted along one or more first directions and not received and/or received at a lower amplitude along one or more second directions. For example, wearable audio device 110 may emit directional audio in a first direction toward an ear of user 160 and not transmit the directional audio in a second direction away from the ear of user 160. In various embodiments, wearable audio device 110 may receive (e.g., pickup, detect, be sensitive to, etc.) directional audio in a first direction from a head of user 160 and not receive other audio in a second direction away from the head of user 160.

In various embodiments, wearable audio device 110 may comprise a wearable communication device configured to communicate audio signals with a remote communication device. The wearable communication device may comprise a land mobile radio. The wearable communication device may comprise a wearable accessory communication device configured to be coupled to a second wearable communication device. The second wearable communication device may be communicatively coupled to the wearable accessory communication device. The second wearable communication device may comprise a land mobile radio coupled to the wearable accessory communication device. For example, the wearable accessory communication device may comprise an accessory microphone and/or speaker coupled to a land mobile radio device via wired connection. The wearable accessory communication device may be configured to be mounted at one or more first positions relative to a user, while the land mobile radio may be configured to be mounted at one or more second positions relative to the user. The one or more first positions may be proximate either shoulder and/or either side of a head of a user, while the one or more second positions may be located about a torso or waist of the user. In various embodiments, the wearable communication device may comprise a wearable video camera.

In various embodiments, wearable audio device 110 may comprise a plurality of transducers 120. The transducers may comprise directional transducers. In system 100, wearable audio device 110 comprises first directional transducer 120-1 and second directional transducer 120-2. First directional transducer 120-1 may comprise a first loudspeaker. Second directional transducer 120-2 may comprise a second loudspeaker. First directional transducer 120-1 and second directional transducer 120-2 may comprise separate elements. In various other embodiments, transducers 120 may comprise one or more microphones (e.g., first microphone, second microphone, etc.). In various embodiments, transducers 120 may comprise a plurality of first transducers, wherein at least one transducer of the plurality of first transducers comprises a first microphone and at least one other transducer of the plurality of first transducers comprises a first loudspeaker. In various embodiments, transducers 120 may comprise a plurality of second transducers, wherein at least one transducer of the plurality of second transducers comprises a second microphone and at least one other transducer of the plurality of second transducers comprises a second loudspeaker. In embodiments, second directional transducer 120-2 may be configured to provide an audio signal in accordance with wearable audio device 110 being located at first position 148-1. First directional transducer 120-1 may be configured to provide an audio signal in accordance with wearable audio device 110 being located at second position 148-2.

Wearable audio device 110 may comprise both first directional transducer 120-1 and second directional transducer 120-2 at a same time, yet selectively operate and/or control the first directional transducer 120-1 and second directional transducer 120-2. For example, one of first directional transducer 120-1 and second directional transducer 120-2 may be configured to provide an audio signal, while the other of first directional transducer 120-1 and second directional transducer 120-2 may be coupled to one of a muted audio signal and a second audio signal different from the audio signal. In an alternate or additional example, one of first directional transducer 120-1 and second directional transducer 120-2 may be activated, while the other of first directional transducer 120-1 and second directional transducer 120-2 is deactivated. In accordance with first directional transducer 120-1 and second directional transducer 120-2, audio signals may be transmitted and/or received from two different directions relative to a housing of wearable audio device 110.

In various embodiments, a directional transducer may be configured to have a directionality. First directional transducer 120-1 may comprise first directionality 130. First directionality 130 may enable transducer 120-1 to provide a minimum amplitude of transmission and/or reception of audio in one or more first directions and an amplitude of transmission and/or reception of other audio in one or more second directions. The amplitude of transmission and/or reception of the other audio in the one or more second directions may be less than the minimum amplitude of transmission, such that a sensitivity of first directional transducer 120-1 is greater in each of the one or more first directions than each of the one or more second directions. In embodiments, first directionality 130 may be predetermined. First directionality 130 may be selected in accordance with a direction between wearable audio device 110 when wearable audio device 110 is mounted at a predetermined position on user 160. In embodiments, first directionality 130 may be fixed (e.g., non-adjustable, non-steerable, etc.). First directionality 130 may comprise a physical property selected to provide directional audio. For example, a shape of a horn of first directional transducer may enable an audio signal to be received or transmitted in a directional manner. First directionality 130 may comprise an electrical property configured to provide directional audio. For example, first directional transducer 120-1 may comprise a phased array. Design of one or more wearable devices may establish positions about user 160 at which system 100 may be positioned, such that adjustment of a directionality of a transducer is not necessary to properly transmit and/or receive audio from user 160. The directionality may improve communication of an audio signal. For example, the directionality may enable a wearer (e.g., law enforcement officer) of the system 100 to hear an audio signal from system 100 without the same audio signal being heard by another person (e.g., bystander, suspect, etc.) proximate the wearer, thereby preserving privacy of the audio signal. As another example, the directionality may enable a wearer to provide a communication audio signal for playback at a remote communication device without additional audio signals (e.g., environmental audio) signals from other environmental audio sources also being captured and transmitted, thereby improving clarity of the communication audio signal.

In various embodiments, first directionality 130 may comprise a first main axis 132 along which first directional transducer 120-1 is configured to propagate and/or capture a first audio signal. The first audio signal may be propagated in a first direction along axis 132 from first directional transducer 120-1, wherein first directional transducer 120-1 comprises a first directional loudspeaker. The first direction may be a direction along which at least the minimum amplitude of the first audio signal may be propagated from first directional transducer. In another, second direction different from the first direction, a propagated amplitude of the same audio signal may be less than the minimum amplitude, including for a same distance in each of the first direction and the second direction. The first audio signal may be captured in a first direction along axis 132 to first directional transducer 120-1, wherein first directional transducer 120-1 comprises a first directional microphone to capture the first audio signal. The first direction may be aligned and/or oriented along first main axis 132. The first direction may be parallel to first main axis 132. In various embodiments, first directional transducer 120-1 may be configured such that first main axis 132 is oriented toward one of two ears of user 160 when wearable audio device 110 is mounted to user 160. In embodiments, first main axis 132 may be provided at a first orientation relative to wearable audio device 110. The fixed orientation may be selected in accordance with one or more predetermined positions at which system 100 may be worn by user 160.

In various embodiments, first directionality 130 may comprise a first beam width 134 along which first directional transducer 120-1 is configured to transmit and/or receive first audio. Beam width 134 may define a lateral and/or horizontal dimension at which audio may be received and/or transmitted at or above predetermined amplitude by first directional transducer 120-1. An audio signal may be captured or received above the minimum threshold in one or more first directions within beam width 134 by the first directional transducer 120-1. Another audio signal may be prevented from being captured or received and/or captured or received below the minimum threshold in one or more second directions outside beam width 134 by first directional transducer 120-1.

In various embodiments, wearable audio device 110 may comprise reference surface 112. Reference surface 112 may comprise a portion of a housing of wearable audio device 110 configured to be oriented in a same reference direction 114 independent of a position at which system 100 is mounted on user 160. Reference surface 112 may be an opposite surface of wearable audio device 110 by which wearable audio device 110 is coupled to mount 150. For example, reference surface 112 may be configured to face a forward reference direction 114 at each of a first relative mount position 148-1 on a first side 142-2 of user 160 and a second relative mount position 148-2 on a second side 142-2 of user 160 opposite the first side 142-1. Reference surface 112 may be positioned between a first side at which first directional transducer 120-1 is positioned on wearable audio device 110 and second side at which second directional transducer 120-2 is positioned on wearable audio device 110. First directional transducer 120-1 and second directional transducer 120-2 may be positioned along opposite ends of an edge of reference surface 112. First directional transducer 120-1 and second directional transducer 120-2 may be positioned along an edge of reference surface 112 proximate opposite corners of a housing of wearable audio device 110. In embodiments, first directional transducer 120-1 may be positioned less than six inches, less than five inches, or less than four inches away from second directional transducer 120-2 in a housing of wearable audio device 110. A spacing between first directional transducer 120-1 and second directional transducer 120-2 may be less than six inches, less than five inches, less than four inches or less than three inches in embodiments according to various aspects of the present disclosure. Despite such a minimum spacing, audio provided between user 160 and wearable audio device 110 may be improved in accordance with various aspects of the present disclosure.

In various embodiments, a reference surface may be integrated with a particular feature associated with a particular function of system 100. For example, reference surface 112 may be integrated with a portion of an image capturing system in order to capture an image in reference direction 114 during use of system 100. For example, the portion of the image capturing system may include lens 116. The portion of the image capturing system may be configured to be oriented in reference direction 114 independent of whether system 110 is disposed on a first side 142-1 of user 160 or second side 142-2 of user. For example, lens 116 may be oriented to capture images in a forward direction independent of whether system is mounted on a left shoulder or a right shoulder of user 160. In an alternate or additional example, reference surface 112 may comprise a mount interface configured to couple to another wearable device (e.g., wearable mount 150, wearable camera, etc.) in a same reference direction 114, independent of whether wearable audio device 110 is mounted on a first side 144-1 or second side 144-2 of a head of user 160. The portion of the image capturing system may be integrated in a same housing as transducers 120, wherein reference surface 112 comprises a surface of the same housing.

In various embodiments, a reference direction may be different from a direction associated with a directivity of a directional speaker. For example, reference direction 114 may be different (e.g. spatially distinct, not overlapping, etc.) from a first direction of main axis 132 of first directional transducer 120-1. Reference direction 114 may not intersect either of main axis 132 or first directionality 130 associated with main axis 132 of first directional transducer 120-1. The first direction of main axis 132 may be perpendicular to reference direction 114. An angle between the first direction of main axis 132 and reference direction 114 may be greater than forty-five degrees, greater than seventy-five degrees, or equal or greater than ninety degrees. A second angle between reference direction 114 and a second direction of a main axis of second directional transducer 120-1 may alternately or additionally be forty-five degrees, greater than seventy-five degrees, or equal or greater than ninety degrees.

In various embodiments, wearable audio device 110 may determine which position of plurality of positions 148 at which the wearable audio device 110 is mounted. Wearable audio device 110 may be associated with the position (e.g., lateral position, relative mount position, etc.) in accordance with a determination of where the wearable audio device 110 is mounted and/or is configured to be mounted. Wearable audio device 110 may detect a relative mount position relative to a head of user 160. Wearable audio device 110 may detect a lateral position relative to midline 140 of user 160. The relative mount position may comprise one of first position 148-1 (e.g., first relative mount position, first lateral position, etc.) and second position 148-2 (e.g., second relative mount position, second lateral position, etc.). Wearable audio device 110 may comprise one or more of a mount sensor, an image sensor, a video sensor, a proximity sensor, and a communication interface configured to detect the position at which the wearable audio device is mounted. The mount sensor may communicate with a mount (e.g., wearable mount 150) coupled to the wearable audio device 110 to receive an indication from the mount regarding the position. The image sensor and audio sensor may capture image data and audio data respectively, which may be processed by wearable audio device 110 to determine the position in accordance with one or more properties of the data (e.g., amplitude of audio data greater at one side of device 110, indicative of position of mouth of user 160, image data corresponding to a left shoulder, left hand, left side of head of user 160, etc.). The proximity sensor may detect presence or absence of a near field object on a side of wearable audio device 110, indicative of a head or other portion of user 160 being present or not present at the side, which may be indicative of the position at which wearable audio device is mounted. The communication interface may receive information regarding the position from a separate device. For example, a configuration of the wearable audio device may be received via a mobile communication device and provided to the wearable audio device 110 via a wired or wireless connection with the mobile communication device. In embodiments, wearable audio device 110 may alternately or additional comprise a user interface, wherein wearable audio device 110 may determine the position of the plurality of positions 148. Detecting the position may comprise detecting an input received via the user interface indicative of the position. In alternate or additional embodiments, the position may be automatically detected by wearable audio device 110, independent of a user interface of wearable audio device 110.

In various embodiments, wearable audio device 110 may adaptively provide one or more audio signals in accordance with the determined position. The one or more audio signals may be provided between one of a processor and a communication interface of wearable audio device 110. The one or more audio signals may be adaptively provided in order to effectively and/or privately receive the one or more audio signals in accordance with the position.

In various embodiments, wearable audio device 110 may select one or more transducers of a plurality of transducers 120 in accordance with the position. The one or more transducers may include at least one proximal transducer. The at least one proximal transducer may include a transducer of the plurality of transducers 120 closest to a side of a head of user 160. The one or more transducers may include at least one personal transducer. The at least one personal transducer may include a transducer of the plurality of transducers 120 with a directivity oriented toward a head of user 160 in accordance with the position. The one or more transducers may include at least one private transducer. The at least one private transducer may include a transducer of the plurality of transducers 120 configured to provide audio toward a user 160 and away from one or more second directions associated with an environment in which user 160 is positioned in accordance with the position.

In various embodiments, wearable audio device 110 may select one or more second transducers of a plurality of transducers 120 in accordance with the position. The one or more second transducers may include at least one distal transducer. The at least one distal transducer may include a transducer of the plurality of transducers 120 farthest from the head of user 160. The at least one distal transducer may be different from a proximal transducer. The one or more transducers may include at least one environmental transducer. The at least one environmental transducer may include a transducer of the plurality of transducers 120 with a directivity oriented away from a head of user 160 in accordance with the position. The at least one environmental transducer may be different from a personal transducer. The one or more transducers may include at least one public transducer. The at least one public transducer may include a transducer of the plurality of transducers 120 configured to provide audio away from user 160 and toward one or more second directions associated with an environment in which user 160 is positioned. The at least one public transducer may be different from a private transducer.

In various embodiments, the one or more transducers 120 may be positioned away from user 160. The one or more transducers 120 may be positioned away from ears 146 of user 160. For example, directional transducer 120-1 may be configured to be positioned at least four inches, at least six inches, or at least eight inches away from second side 144-2 of the head of user 160. By being positioned away, transducers 120 and wearable audio device 110 may prevent ears 146 of user 160 from being occluded from other sound in an ambient environment. In embodiments, a relative spacing between a head of user 160 and transducers 140 may be determined in accordance with one or more positions 148 at which one or more wearable devices of system 100 may be mounted.

Providing an audio signal may comprise coupling an audio signal to and/or from a selected first transducer. The selected first transducer may comprise one or more of a proximal transducer, a personal transducer, and/or a private transducer selected in accordance with a determined position (e.g., mount position). For example, an audio signal is coupled to first directional transducer 120-1 in accordance with wearable audio device 110 determining that wearable audio device 110 is associated with second position 148-1. First directional transducer 120-1 may comprise a first loudspeaker configured to emit the audio signal in accordance with first directivity 132. First directional transducer 120-1 may be configured to emit the audio signal to second ear 146-2 of user 160. Accordingly, user 160 may hear the audio signal in an effective and/or private manner upon system 100 being mounted at second position 148-2. In accordance with first position 148-1, the audio signal may be provided via second directional transducer 120-2, rather than first directional transducer 120-1. A portion of an audio signal may be provided via first directional transducer 120-1 in accordance with second position 148-2 and, upon repositioning of system 100 to first position 148-1, a second portion of the audio signal may be provided via second directional transducer 120-2 in accordance with first position 148-1.

In various embodiments, coupling the audio signal to selected first transducer may include preventing output of the same audio signal from a second transducer. The second transducer may comprise one or more of a distal transducer, environmental transducer, and/or public transducer. The audio signal may be excluded from being received and/or transmitted by the second transducer. For example, second directional transducer 120-2 may be muted and/or a muted audio signal may be provided to second directional transducer 120-2 in accordance with second position 148-2. A transducer such as second directional transducer 120-2 may not emit or capture an audio signal in accordance with the muted audio signal and/or being muted. Accordingly, the audio signal may be provided to and/or from user 160 via first directional transducer 120-1 and prevented from being provided to and/or from an ambient environment via second directional transducer 120-2 in accordance with second position 148-2. In accordance with wearable audio device 110 determining to be positioned at second position 148-2, the audio signal may be excluded from first directional transducer 120-1, rather than second directional transducer 120-2. In embodiments, less than all of transducers 120, such as a single transducer of transducers 120, may be configured to provide the audio signal.

Figure 2:
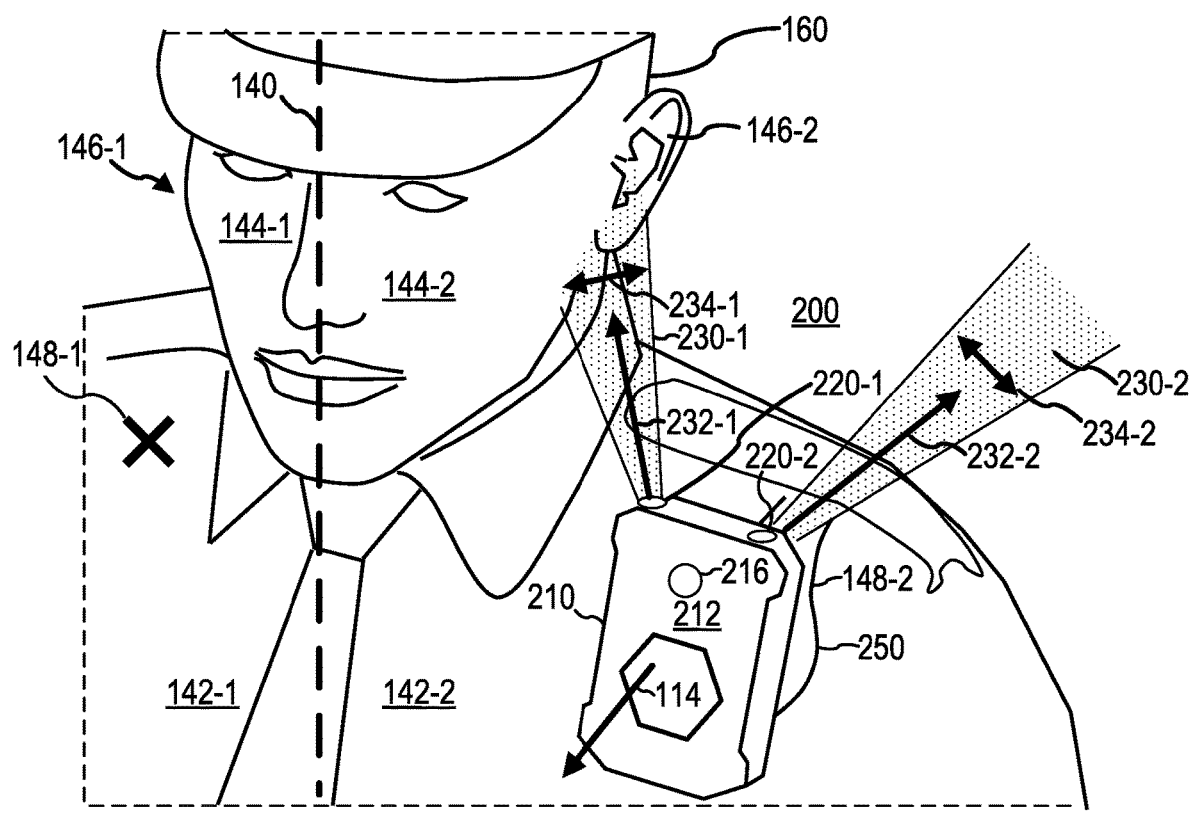
FIG. 2 is a perspective view of an exemplary wearable communication device with adaptive directional audio in accordance with various embodiments.

In various embodiments, and with reference to FIG. 2, an exemplary wearable audio system 200 is disclosed. System 200 may be configured to provide an audio signal to user 1160 and an environmental audio signal. System 200 may include wearable audio device 210 and a wearable mount 250. Wearable audio device 210 may comprise a wearable communication device. Wearable audio device 210 may alternately or additionally comprise a wearable recording device. For example, wearable audio device 210 may comprise a body-worn camera comprising a communication circuit configured to enable the body-worn camera to transmit and/or receive one or more communication audio signal via a communication network. The body-worn camera may further comprise a non-transitory memory on which video, audio, and/or audiovisual data may be recorded during and/or after transmission and/or reception of the one or more communication audio signals.

In embodiments, one or more components of system 200 may correspond to one or more respective components of system 100 with brief reference to FIG. 1. For example, mount 250 may comprise mount 150, wearable audio device 210 may comprise wearable audio device 110, lens 216 may comprise lens 116, reference surface 212 may comprise reference surface 112, first transducer 220-1 may comprise first transducer 120-1, and/or second transducer 220-2 may comprise second transducer 120-2. In embodiments, wearable audio device 210 may comprise wearable audio device 110 further configured to provide a second audio signal in accordance with a position of a user.

Wearable audio device 210 may include first directional transducer 220-1 and second directional transducer 220-2. First directional transducer 220-1 may include a first directional loudspeaker and second directional transducer 220-2 may include a second directional loudspeaker. In alternate or additional embodiments, first directional transducer 220-1 may include a first microphone and second directional transducer 220-2 may include a second microphone. Wearable audio device 210 may further comprise a reference surface 212 and a portion (e.g., lens 216) of an image capturing system integrated with reference surface 212. Reference surface 212 and lens 216 may be oriented in reference direction 114. In embodiments, reference surface 212 may further comprise one or more additional elements, such as a user interface (e.g., button, switch, touchscreen or combinations thereof) configured to activate the image capturing system associated with lens 216 and enable an image to be captured via lens 216 and subsequently recorded by wearable audio device 210.

In various embodiments, first directional transducer 220-1 may have first directionality 230-1 and loudspeaker and second directional transducer 220-2 may have second directionality 230-2. First directionality 230-1 may be spatially distinct from second directionality 230-2. First directional transducer 220-1 may propagate an audio signal (e.g., communication audio signal) in a distinct, non-overlapping direction and region relative to a second region and direction along which second directional transducer 220-2 may propagate a second audio signal in accordance with respective first directionality 230-1 and second directionality 230-2. Reference direction 114 may be further spatially distinct from each of first directionality 230-1 and second directionality 230-2.

In various embodiments, first directionality 230-1 may include first main axis 232-1 oriented in a first direction and second directionality 230-2 may include a second main axis 232-2 oriented in second direction. The first direction may be different from the second direction, thereby enabling audio to be provided along different directions relative to a housing of wearable audio device 210. Reference direction 114 may not intersect either of first main axis 232-1 or first directionality 230-1 associated with first main axis 232-1 of first directional transducer 220-1. Reference direction 114 may not intersect either of second main axis 232-2 or second directionality 230-2 associated with second main axis 232-2 of second directional transducer 220-1. In embodiments, an angle between first main axis 232-1 and second main axis 232-2 is equal or greater than thirty degrees, equal or greater than forty-five degrees, equal or greater than seventy-five degrees, or equal or greater than ninety degrees. In various embodiments, the angle between the first main axis 232-1 and the second main axis 232-2 may be alternately or additionally less than ninety degrees. For example, the angle may be greater than thirty degrees and less than ninety degrees. In embodiments, an angle between the first direction and the second direction is equal or greater than thirty degrees, equal or greater than forty-five degrees, equal or greater than seventy-five degrees, or equal or greater than ninety degrees. In various embodiments, the angle between the first direction and the second direction may be less than ninety degrees. For example, the angle may be greater than thirty degrees and less than ninety degrees. In embodiments, first main axis 232-1 may be oriented toward second ear 146-2 of user 160 when wearable audio device 210 is disposed relative to second side 144-2 of the head of user 160 and second main axis 232-2 may be oriented toward first ear 146-1 of user 160 when wearable audio device 210 is disposed relative to first side 144-1 of the head of user 160.

In various embodiments, first directionality 230-1 may include first beam width 234-1 and second directionality 230-2 may include second bam width 234-2. First beam width 234-1 and second beam width 234-2 may be defined along first main axis 232-1 and second main axis 232-2 respectively. First beam width 234-1 and second beam width 234-2 may be determined in accordance with a same minimum amplitude, an audio signal may be received and/or transmitted at an amplitude equal or greater than the minimum amplitude within each of first beam width 234-1 and second beam width 234-2. Outside a region defined in accordance with each of first beam width 234-1 and second beam 234-2 respectively, an audio signal captured or propagated by respective directional transducers 220-1 and 220-2 may be less than the minimum amplitude. In embodiments, one or more of first beam width 234-1 and second beam width 234-2 may comprise a minimum beam width at a predetermined distance. The distance may correspond to a distance between a mount position (e.g., position 148-2) and an ear (e.g., left ear 146-2) of a user. For example, one or more of first beam width 234-1 and second beam width 234-2 may comprise one of four inches, six inches, eight inches, or ten inches at a corresponding distance along respective first main axis 232-1 and second main axis 232-2 of four inches, six inches, eight inches, or ten inches in embodiments according to various aspects of the present disclosure. In embodiments, a beam width may be selected in accordance with a range of expected positions of an ear of a user, independent of an actual, measured, detected, or otherwise determined position of the ear relative to a wearable audio device. In embodiments, a wearable audio device may determine a mount position (e.g., mount position, lateral position, relative mount position, etc.) independent of subsequent indication of an actual position of an ear of a user. In embodiments, a position of an ear of a user may not be measured, detected, or otherwise determined relative to a wearable audio device, independent of the position of the wearable audio device itself.

In various embodiments, wearable audio device 210 may be configured to provide adaptive directional audio. Wearable audio device 210 may initially determine a position at which wearable audio device 210 is mounted and/or associated. For example, the position may be determined in accordance with an automatically detected position from a sensor or a manually received via a user interface as discussed above with regards to wearable audio device 110 with brief reference to FIG. 1. The position may comprise one of first position 148-1 and second position 148-2. In accordance with the position, one of transducers 220 may be selected as the transducer for communicating audio with user 160. For example, a first directional loudspeaker of first directional transducer 220-1 may be selected as a personal loudspeaker in accordance with wearable audio device 210 detecting that wearable audio device 210 is associated with second position 148-2. Wearable audio device 210 may then provide an audio signal to the personal loudspeaker. In embodiments, the audio signal may comprise a communication audio signal. Wearable audio device 210 may receive the communication audio signal via a communication interface and route the communication audio signal to the personal loudspeaker in accordance with second position 148-2 being associated with wearable audio device 210. Such an arrangement may improve audibility of the communication audio signal to user 160 and/or decrease the audibility of the communication audio signal to other persons and/or pickup devices proximate wearable audio device 210.

In various embodiments, a second transducer of wearable audio device 210 may be further controlled in accordance with a position. In accordance with the position, another one of transducers 220 may be selected as the transducer for communicating audio with an ambient environment. For example, a second directional loudspeaker of second directional transducer 220-2 may be selected as an environment loudspeaker in accordance with wearable audio device 210 detecting that wearable audio device 210 is associated with second position 148-2. Wearable audio device 210 may then provide a second audio signal to the environmental loudspeaker. For example, the second audio signal may comprise one or more a noise cancellation signal or a noise masking signal. A noise cancellation signal may have an inverse phase relative to a first audio signal output by a personal loudspeaker of wearable audio device 210, thereby cancelling or at least substantially decreasing audibility of the first audio signal in a direction away from user 160. A noise masking signal may comprise a white noise signal or other noise signal selected to generate additional audio signals in a direction away from the user (e.g., along second main axis 232-2), thereby obscuring or concealing a first audio signal output by a first directional loudspeaker. In an alternate or additional example, a microphone of second directional transducer 220-2 may be selected as an environment microphone in accordance with wearable audio device 210 detecting that wearable audio device 210 is associated with second position 148-2. Wearable audio device 210 may then capture an environmental audio signal from an ambient environment and generate a noise cancelling signal based on the environmental audio signal. The noise cancelling signal may be output from a directional loudspeaker to decrease (e.g., cancel) an amplitude of the ambient noise signal in an area proximate wearable audio device 210. For example, the noise cancelling signal may be output by a first directional loudspeaker of first directional transducer 220-1 after being generated in accordance with an environmental audio signal captured by a microphone of second directional transducer 220-2. Accordingly, the second transducer of wearable audio device may be employed to improve the auditory quality of an audio signal provided to a user by another transducer of wearable audio device 210. Alternately or additionally, an environmental audio signal captured by the microphone of second directional transducer 220-2 may be recorded as audio data that corresponds to video data concurrently captured via lens 216 and recorded by wearable audio device. At a same time, first directional transducer 220-1 may comprise a first microphone configured to capture a communication audio signal from user 160. The communication audio signal may be transmitted from wearable audio device 210. The communication audio may be transmitted from wearable audio device 210 rather than recorded as audio data. At first position 248, audio from the microphones of directional transducers 220 may be reversed, such that a communication audio signal is captured via the second microphone of second directional transducer 220-2 and an environmental audio signal is captured via first microphone of first directional transducer 120-2. Accordingly, audio signals captured via same microphones of a wearable audio device may be adapted in accordance with difference positions of the wearable audio device, thereby overcoming technical issues associated with having a variably positioned wearable audio device.

In various embodiments, the directional audio may be adaptively provided by wearable audio device 210 in accordance with another detected position. For example, wearable audio device 210 may select a first directional loudspeaker of first directional transducer 220-1 as a private loudspeaker in accordance with a one position, such as second position 148-2. First directional transducer 220-1 may be proximate or oriented toward a closest side of the head of user (e.g., second side 144-2) compared a position and/or orientation of second directional transducer 220-2. A first portion of an audio signal may be provided to the first directional loudspeaker in accordance with the first directional loudspeaker being selected as the private loudspeaker. The first portion of the audio signal may be prevented from being output via a second directional loudspeaker of wearable audio device 210 in accordance with the selection. At a subsequent point in time, the other position may be associate with wearable audio device 210. For example, wearable audio device 210 may be remounted at first position 148-1. At first position 148-1, reference surface 112 may be oriented in same reference direction 214 in order to enable images to be captured by lens 216 of an image capturing system in a same forward direction relative to user. However, second directional transducer 220-2 may be proximate or oriented toward a head of a user 160 (e.g., first side of head 144-1), rather than first directional transducer 220-1. Wearable audio device 210 may then select another loudspeaker as the private loudspeaker. For example, second directional transducer 220-2 may comprise a second directional loudspeaker selected as the private loudspeaker in accordance with the first position 148-1 being associated with the wearable audio device at the second point in time. Because of the change in relative position of wearable audio device 210 from second side 144-2 of user 160 to first side 144-1 of user 160, from A second portion of the audio signal may be output from the second directional loudspeaker, instead of the first directional loudspeaker. Output of the audio signal from the first directional loudspeaker may be discontinued in accordance with the wearable audio device 210 being associated with the first position 148-1. The second portion may comprise a portion of the audio signal chronologically subsequent the first portion of the audio signal. Alternately or additionally, a second audio signal (e.g., masking signal, ambient noise signal, etc.) may be received from a different transducer of wearable audio device as well upon another position being associated with wearable audio device 210. Upon switching sides 142 of user 160, a function provided by a transducer, or not provided by the transducer, may switch as well. Accordingly, directional audio may be adaptively provided to user 160, independent of whether wearable audio device 210 is mounted or associated with a first side 142-1 of user 160 or second side 142-2 of user 160. Switching (recoupling, re-providing, etc.) may be performed automatically by wearable audio device 210, thereby enabling the audio signal to continue to be audible from an optimally positioned and/or oriented transducer for each change in position of wearable audio device 210.

Figure 3:
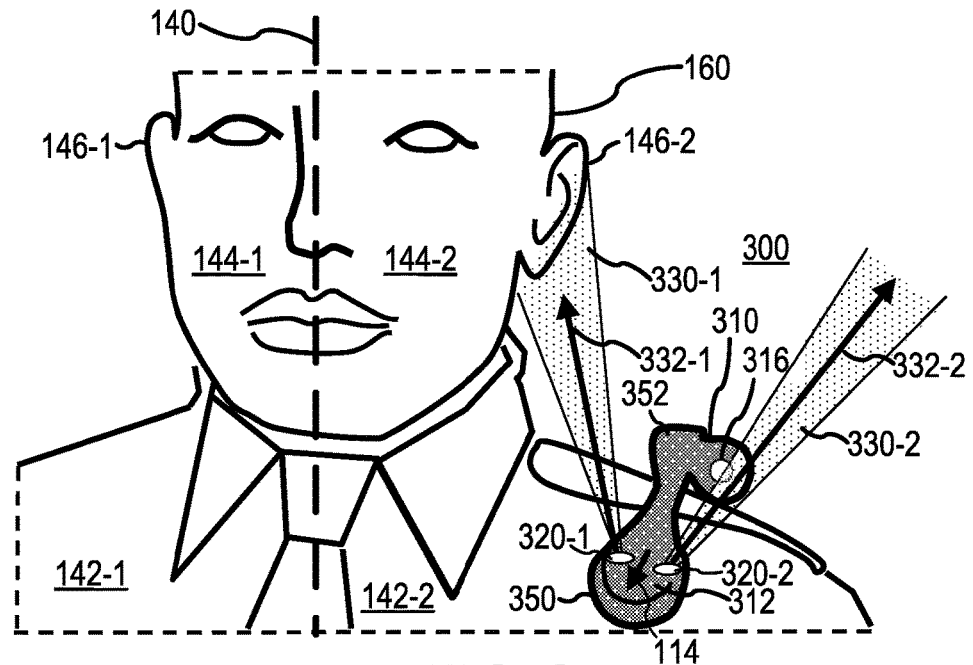
FIG. 3 is a perspective view of an exemplary wearable communication device with adaptive directional audio in accordance with various embodiments.

In various embodiments, and with reference to FIG. 3, an exemplary wearable audio system 300 is disclosed. System 300 may be configured to provide an audio signal to user 160 and an environmental audio signal. System 300 may include wearable audio device 350 and a wearable recording device 310. Wearable recording device 310 may include a wearable camera. Wearable audio device 350 may comprise a wearable mount. Compared with system 200, adaptive directional audio may be provided by wearable audio device 350 separate from a device 310 by which one or more images may be recorded.

In embodiments, one or more components of system 300 may correspond to (e.g., perform corresponding operations of) one or more respective components of system 100 with brief reference to FIG. 1. For example, mount 350 may correspond to mount 150, lens 316 may correspond to lens 116, reference surface 312 may correspond to reference surface 112, first transducer 320-1 may correspond to first transducer 320-1, and/or second transducer 320-2 may correspond to second transducer 320-2. In embodiments, system 300 may comprise an integrated wearable audio device and mount. System 300 may be further coupled to a wearable recording device 310. In embodiments, audio circuitry of the wearable audio device (e.g., transducer 320) may be integrated with mount 350, rather than another device, such as recording device 310.

In embodiments, wearable audio device 350 may receive an audio signal from a second device. For example, wearable audio device 350 may be coupled to a second device comprising one or more of a land mobile radio, recording device 310, a mobile communication device, or other communication device via wired and/or wireless connection. The second device may comprise a communication circuit configured transmit and/or receive one or more communication audio signals via a communication network. The one or more communication audio signals may be provided between wearable audio device 350 and the second device via the wired and/or wireless connection. Wearable audio device may comprise a communication interface configured to receive and/or transmit the one or more communication audio signals and selectively provide the one or more communication audio signals to a transducer of a plurality of transducers 320 of wearable audio device 350.

Wearable audio device 350 may include first directional transducer 320-1 and second directional transducer 320-2. First directional transducer 320-1 may include a first directional loudspeaker and second directional transducer 320-2 may include a second directional loudspeaker. In embodiments, first directional transducer 320-1 may alternately or additionally include a first microphone and second directional transducer 320-2 may alternately or additionally include a second microphone. In embodiments, a microphone and a loudspeaker associated with a same first directional transducer (e.g., first directional transducer 320-1, 220-1, and/or 120-1) may be oriented in a same direction relative to a wearable audio device with which they are integrated.

In various embodiments, first directional transducer 320-1 and second directional transducer 320-2 may be associated with different sides 144 of a head of user 160. First directional transducer 320-1 may be configured to provide an audio signal to a second side 144-2 of a head of user 160. First directional transducer 320-1 may comprise first directionality 330-1 oriented in a first direction away from a first side of wearable audio device 350. First directionality 330-1 may comprise a first main axis 332-1 configured to be aligned with second ear 146-2 of user 160 when wearable audio device 350 is associated with a second side 142-2 of user 160. Accordingly, when the first side of wearable audio device 350 is oriented toward second side 144-2 of the head of user 160, an audio signal from first directional transducer 320-1 may be emitted from wearable audio device 350 to second ear 142-2 of user 160. Second directional transducer 320-2 may comprise second directionality 330-2 oriented in a second direction away from a second side of wearable audio device 350 opposite the first side of wearable audio device 310. Second directionality 330-2 may comprise a second main axis 332-2 configured to be aligned with first ear 146-1 of user 160 when wearable audio device 350 is associated with first side 142-1 of user 160. Accordingly, when the second side of wearable audio device 350 is oriented toward first side 144-1 of the head of user 160, an audio signal from second directional transducer 320-2 may be emitted from wearable audio device 350 to first ear 142-1 of user 160. First side of wearable audio device 350 may be oriented toward second side 144-2 of the head of user 160 when wearable audio device 350 is disposed on second side 142-2 of user 160 and second side of wearable audio device 350 may be oriented toward first side 144-1 of the head of user 160 when wearable audio device 350 is disposed on first side 142-1 of user 160. In embodiments, first directional transducer 320-1 may correspond to first directional transducer 220-1 and/or first directional transducer 120-1 and second directional transducer 320-2 may correspond to second directional transducer 220-2 and/or second directional transducer 120-1 with brief reference to FIG. 1-2. Wearable audio device 350 may selectively provide or exclude audio signals from first directional transducer 320-1 and second directional transducer 320-2 in a same or similar manner as one or more of wearable audio device 110 or wearable audio device 210 with brief reference to FIG. 1-2.

In various embodiments, wearable audio device 350 may further comprise a reference surface 312. Reference surface 312 may be oriented in reference direction 114. Reference surface 312 may be configured to be oriented in reference direction 114 independent of whether wearable audio device 350 is associated with a first side 142-1 of user 160 or second side 142-2 of user 160.

In various embodiments, wearable audio device 350 may further comprise a mount interface 352. Mount interface 350 may enable wearable audio device 350 to be physically coupled to wearable recording device 310. Mount interface 352 may be integrated with reference surface 312 of wearable audio device 350. Mount interface 352 may comprise one or more of a post, slot, receptable, latch, pin, hinge, teeth, claps, or magnet configured to securely couple to wearable recording device 310. In embodiments, wearable recording device 310 may comprise a second mount interface configured to securely couple to mount interface 352.

In various embodiments, wearable recording device 310 may comprise lens 316 of an image capturing system. Lens 316 may be oriented in reference direction 114. Lens 316 may be configured to be oriented in reference direction independent of whether system 300 is disposed on first side 142-1 or second side 142-2 of user 160. Accordingly, directional transducers 320 may be disposed in a different housing (e.g., housing of wearable audio device 350) from a housing (e.g., housing of wearable recording device 310) in which lens 316 is disposed in system 300. Such an arrangement may enable different combinations of wearable audio devices and wearable recording devices to be used in a system. In embodiments, wearable audio device 350 may be used independent of whether wearable audio device 350 is coupled to wearable recording device 310, thereby enabling directional audio to be provided independent of whether audiovisual data is recorded by system 300, and thereby providing wearable audio device 350 with standalone functionality. Wearable audio device 350 may also enable adaptive directional audio to be provided to a wearable communication device and/or a wearable audio device lacking directional transducers and/or adaptive directional audio functionality discussed herein.

Figure 4:
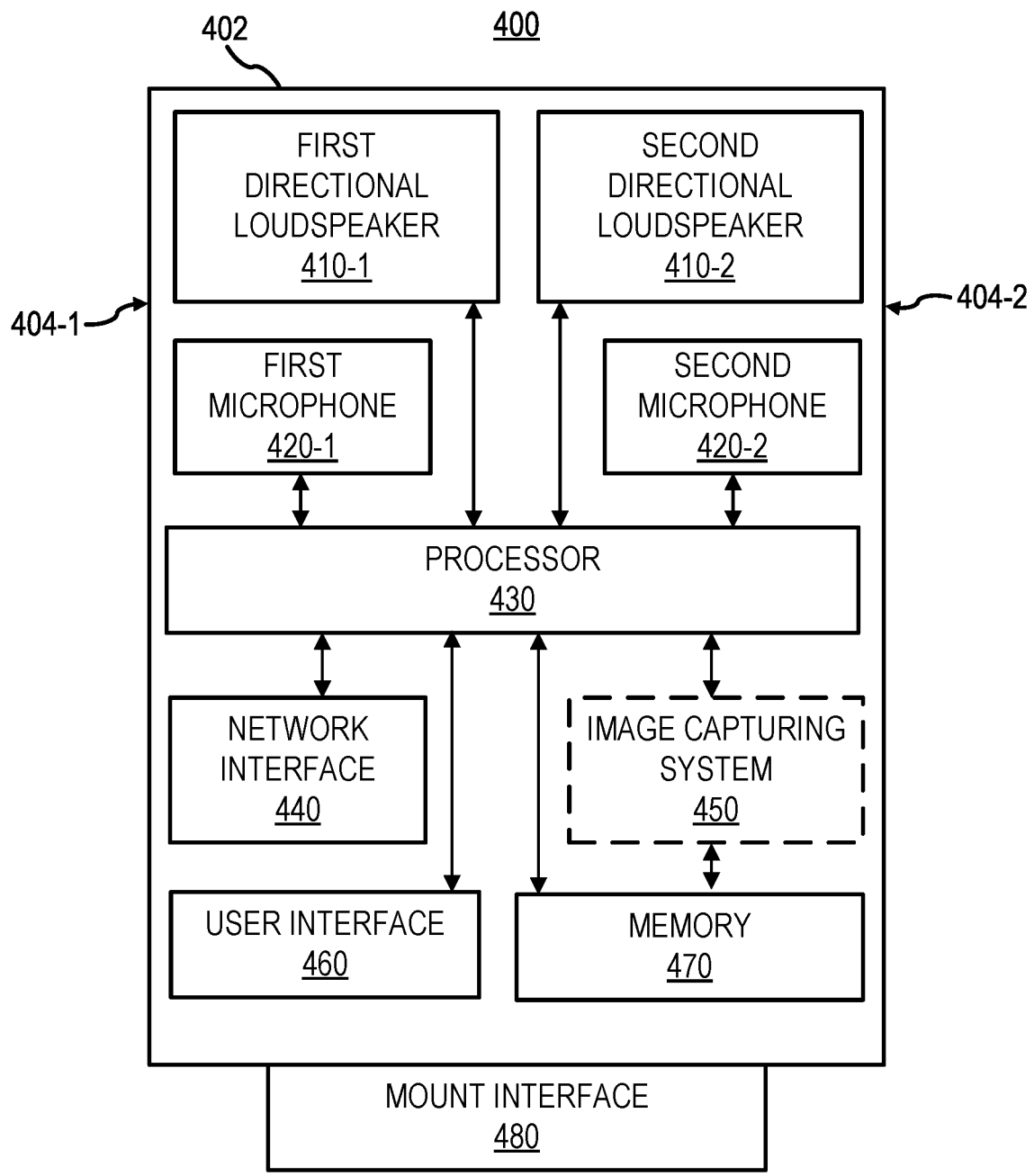
FIG. 4 is a block diagram of an exemplary computing device in accordance with various embodiments.

In various embodiments, and with reference to FIG. 4, an exemplary wearable audio device 400 may be configured to adaptively provide audio signals to a user via two or more transducers having different directionalities. The transducers may comprise loudspeakers 410 and/or microphones 420. In various embodiments, wearable audio device 400 may comprise housing 402 having sides 404, one or more loudspeakers, one or more microphones 420, processor 430, network interface 440, mount interface 480, and user interface 460. In embodiments, wearable audio device 400 may further include memory 470 and image capturing system 450. However, in various embodiments, memory 470 and image capturing system 450 may be excluded and/or wearable audio device 400 may provide adaptive directional audio independent of whether wearable audio device 400 comprises these components 450,470. In embodiments, wearable audio device 400 may correspond to, perform one or more operations of, and/or comprise one or more similar components and functions as wearable audio device 110, wearable audio device 210, and/or wearable audio device 350 with brief reference to FIGS. 1-3.

In various embodiments, processor 430 may comprise circuitry, electrical components, electronic components, software, and/or the like configured to perform various operations and functions discussed herein. For example, processor 430 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processor 430 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 430 may include data buses, output ports, input ports, timers, memory, arithmetic units, and/or the like.

Processor 430 may be configured to provide and/or receive electrical signals whether digital and/or analog in form. Processor 430 may provide and/or receive digital information via a data bus using any protocol. Processor 430 may receive information, manipulate the received information, and provide the manipulated information. Processor 430 may record (e.g., buffer, store, etc.) information and retrieve recorded information. Information received, recorded, and/or manipulated by processor 430 may be used to perform a function, control a function, and/or to perform an operation or execute a stored program.

Processor 430 may control the operation and/or function of other circuits and/or components of wearable audio device 400. Processor 430 may receive status information regarding the operation of other components, perform calculations with respect to the status information, and provide commands (e.g., instructions) to one or more other components. Processor 430 may command another component to start operation, continue operation, alter operation, suspend operation, cease operation, or the like. Commands and/or status may be communicated between processor 430 and other circuits and/or components via any type of bus (e.g., serial peripheral interface (SPI) bus) including any type of data/address bus.

In various embodiments, processor 430 may be in electrical and/or electronic communication with one or more loudspeakers 410, one or more microphones 210, memory 470, network interface 440, and image capturing system 450. Processor 430 may be in electrical, electronic, and/or mechanical communication with user interface 460.

In various embodiments, memory 470 may comprise one or more memory, data structures, or the like configured to store data, programs, and/or instructions. Memory 470 may be in electrical and/or electronic communication with processor 430, network interface 440, and/or image capturing system 450.

In an embodiment, memory 470 may comprise a tangible, non-transitory computer-readable memory. Instructions stored on the tangible non-transitory memory may allow processor 430 to perform various operations, functions, and/or steps, as described herein. For example, in response to processor 430 executing the instructions on the tangible non-transitory memory, processor 430 may communicate with loudspeakers 410, microphones 420, image capturing system to capture image and/or audio data, transmit and/or receive image and/or audio data, end capturing of the image and/or audio data, and/or the like, as discussed further herein. In alternate and/or additional embodiments, and in response to processor 430 executing the instructions on the tangible non-transitory memory 470, processor 430 may communicate with loudspeakers 410, and microphones 420, and network interface 440 to provide one or more audio signals between one or more loudspeakers of loudspeakers 410 and network interface 440, provide one or more audio signals between one or more microphones of microphones 420 and network interface 440, and generate one or more noise cancellation signals from one or more microphones of microphones 420. Processor 430 may execute the instructions in response to operation of user interface 460, as discussed further herein. In embodiments, memory 470 may also be configured to receive, record, and maintain incident recordings, including captured image and audio data. In that regard, memory 470 may include a storage medium, data structure, database, memory unit, hard-disk drive (HDD), solid state drive (SSD), removable memory, and/or the like.

In various embodiments, network interface 440 may be configured to enable the transmission and/or reception of data between wearable audio device 400 and one or more additional devices, servers, networks, or the like. Network interface 440 may be in electric and/or electronic communication with processor 430 and/or memory 470. Network interface 440 may comprise one or more suitable hardware and/or software components capable of enabling the transmission and/or reception of data, such as, for example, a communication interface, as discussed further herein. In various embodiments, network interface 440 may receive and/or transmit data associated with one or more of an audio signal or communication audio signal as further described herein.

In various embodiments, network interface 440 may comprise a communication interface. A communication interface may comprise suitable hardware and/or software components capable of enabling the transmission and/or reception of signals. In various embodiments, the signals may convey data. In alternate or additional embodiments, the signals may comprise analog signals on which one or more audio signals may be modulated. The signals may comprise communication audio signal. In embodiment, data corresponding to one or more communication audio signal may be transmitted and/or received via a communication interface. A communications interface may enable electronic communications between devices and systems. A communication interface may enable communications over a network. Examples of a communication interface may include a modem, a network interface (such as an Ethernet card), a communications port, etc. Data may be transferred via a communication interface in the form of signals which may be electronic, electromagnetic, optical, or other signals capable of being transmitted or received by a communication interface. A communication interface may be configured to communicate via a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or another protocol capable of transmitting information via a wired or wireless connection. In alternate or additional embodiments, one or more wired and/or analog communication protocols.

In various embodiments, image capturing system 450 may be configured to capture an image or series of images (e.g., video). For example, during an incident recording image capturing system 450 may be configured to capture images and/or video of the incident recording. Image capturing system 450 may comprise various hardware and/or software components configured to capture images and/or video. For example, image capturing system 450 may comprise one or more cameras configured to capture images and/or video. Image capturing system 450 may be in electric and/or electronic communication with processor 430 and/or memory 470. Processor 430 may control (e.g., instruct) image capturing system 450 to begin capturing images and to end capturing of the images. Processor 430 may also control (e.g., instruct) image capturing system 450 to transmit the captured images to memory 470 for buffering and/or storage. Image capturing system 450 may transmit (e.g., stream) the captured images to memory 470 as the images are captured or in response to image capturing system 470 ending capturing of the images.

In various embodiments, image capturing system 470 may comprise a lens (e.g., lens 116 or 216 or 316) with brief reference to FIG. 1-2. The lens may be integrated with a side of housing 402 of wearable audio device 400. The lens may be integrated on a surface of housing 402 of wearable audio device 400. The surface may comprise a reference surface as discussed elsewhere herein. In other embodiments, wearable audio device 400 may exclude image capturing system 450 from housing 402. In such embodiments, an image capturing system and lens may be housed separately from wearable audio device 400 in a different housing.

User interface 460 may comprise any suitable hardware, software, mechanical, and/or electronic components configured to enable the user interaction. For example, and in accordance with various embodiments, user interface 460 may comprise a button, switch, or the like. In that regard, user interface 460 may be configured to move, slide, rotate, or otherwise become physically depressed or moved upon application of physical contact. As a further example, and in accordance with various embodiments, user interface 460 may comprise a touchscreen or similar interface enabling user input. As a further example, and in accordance with various embodiments, user interface 460 may include voice control technology. In that regard, user interface 460 may at least partially integrate with microphones 420 to receive voice commands (e.g., "Record", "Stop Record", "Capture Image", "Record Audio", etc.). Voice command technology is well known in the art, and user interface 460 may implement any suitable voice command technology. User interface 460 may be integrated with a side of housing 402 of wearable audio device 400. User interface 460 may be integrated on a surface of housing 402 of wearable audio device 400. The surface may comprise a reference surface as discussed elsewhere herein.

In various embodiments, in response to user interface 460 being activated (e.g., physically activated, voice activated, touch-screen selection, etc.), processor 430 may be configured to perform various operations including starting and/or stopping an incident recording, controlling operation of image capturing system 450, controlling operation of microphones 420, and/or the like, as discussed further herein. In embodiments, a position of wearable audio device 400 may be determined in accordance with an input received via user interface 460. Wearable audio device 400 may detect an input indicative of the position via user interface 460 and, in accordance with the detected input, determine the position. In alternate or additional embodiments, a position of wearable audio device 400 may be detected independent of user interface 460.

In various embodiments, user interface 460 may include an authorization control configured to control access and operation of wearable audio device 400. For example, user interface 460 may comprise a biometric authorization control, such as a fingerprint reader, configured to control access and operation of wearable audio device 400.

In various embodiments, user interface 460 may include a sensor configured to detect a relative position of wearable audio device 400. For example, user interface 460 may comprise one or more a mount sensor, a motion sensor, or a proximity sensor. Information regarding the relative position may be detected by the sensor and provided to processor to determine the relative position. In alternate or additional embodiments, information regarding the relative position may alternately via one or more of an audio sensor, an image sensor, a video sensor, and/or communication interface of other components of wearable audio device 400, such as one or more microphones of microphones 420, a loudspeaker of loudspeakers 410, and/or elements of image capturing system 450. The sensor may be distinct from a geographical location sensor, such as a global positioning system (GPS) receiver, which may provide indication of a geographical location of wearable audio device 400, but lack and/or be unable to provide information regarding a relative or lateral position of wearable audio device relative a user. In embodiments, the sensor may detect a change in state of wearable audio device 400 and, in accordance with the change in stage of wearable audio device 400. In embodiments, the change in state may be associated with one or more of a coupling, decoupling, movement, or other adjustment in physical position and/or proximity of wearable audio device 400.

In various embodiments, wearable audio device 400 may comprise at least two directional transducers configured to provide adaptive directional audio in accordance with a relative position of wearable audio device 400. Directionality of each transducer of the at least two directional transducers may be provided in accordance with physical characteristics (e.g., horn shape, reflective surfaces, transducer array, etc.) and/or electrical characteristics (e.g., frequency filtering, phase shifted output, etc.) of each transducer. The at least two directional transducers may include first directional loudspeaker 410-1 and second directional loudspeaker 410-2. First directional loudspeaker 410-1 may comprise first directionality oriented away from a first side 404-1 of housing 402 of wearable audio device 400. Second directional loudspeaker 410-2 may comprise second directionality oriented away from second side 404-2 of housing 402 of wearable audio device 400. The first side 404-1 and second side 404-2 may be different sides 404 of wearable audio device 400. In embodiments, first side 404-1 and second side 404-2 may be opposite sides 404 of wearable audio device 400. In alternate embodiments, first directional loudspeaker 410-1 and second directional loudspeaker 410-2 may be disposed on a common side of a wearable audio device, yet oriented in different directions as described elsewhere herein. The at least two transducers, may be mounted on a same or common side of housing 402, but a directionality of the at least two transducers may be directed from the same side of housing 402 toward different respective sides 404 of housing 402. In various embodiments, first directional loudspeaker 410-1 may correspond to one or more of first directional transducer 120-1, first directional transducer 220-1, and/or first directional transducer 320-1 with brief reference to FIG. 1-3. In various embodiments, second directional loudspeaker 410-2 may correspond to one or more of second directional transducer 120-2, second directional transducer 220-2, and second directional transducer 320-2 with brief reference to FIG. 1-3.

In various embodiments, wearable audio device 400 the at least two directional transducers may include first microphone 420-1 and second microphone 410-2. First microphone 420-1 may comprise a first directional microphone and second microphone 410-2 may comprise a second directional microphone. First microphone 420-1 may capture a first audio signal at a first side 404-1 of wearable audio device 400. The first audio signal may be directed toward the first side 404-1 of wearable audio device 400 and/or received in a direction toward first side 404-1 of wearable audio device 400. Second microphone 420-2 may capture a second audio signal at a second side 404-2 of wearable audio device 400. The second audio signal may be directed toward second side 404-2 of wearable audio device 400 and/or received in a direction toward second side 404-2 of wearable audio device 400. In alternate embodiments, first microphone 420-1 and second microphone 420-2 may be disposed on a common side of a wearable audio device, yet configured to receive audio signals from different directions as described elsewhere herein. In various embodiments, one or more of first directional transducer 120-1, first directional transducer 220-1, and first directional transducer 320-1 may comprise first microphone 420-1 with brief reference to FIG. 1-3. In various embodiments, one or more of second directional transducer 120-2, second directional transducer 220-2, and second directional transducer 320-2 may comprise second microphone 420-2 with brief reference to FIG. 1-3.

In various embodiments, processor 430 may provide one or more audio signals between a transducer and another element of wearable audio device 400. In embodiments, the other element of wearable audio device 400 may comprise processor 430 and network interface 440 and/or a communication interface of network interface 440. For example, processor 430 may provide an audio signal to first directional loudspeaker 410-1. Processor 430 may provide an audio signal to second directional loudspeaker 410-2. Processor 430 may receive an audio signal from first microphone 420-1. Processor 430 may receive an audio signal from second microphone 420-2. Processor 430 may couple an audio signal to first directional loudspeaker 410-1 from network interface 440. Processor 430 may couple an audio signal to second directional loudspeaker 410-2 from network interface 440. Processor 430 may direct (e.g., switch, couple, relay, etc.) a communication audio signal to first directional loudspeaker 410-1 from network interface 440. Processor 430 may direct a communication audio signal to second directional loudspeaker 410-2 from network interface 440. Processor 430 may direct a communication audio signal to network interface 440 from first microphone 410-1. Processor 430 may direct a communication audio signal to network interface 440 from second microphone 410-2. In embodiments, processor 430 may further decouple (e.g., disconnect, not direct, etc.) a given transducer to a given audio signal.

In various embodiments, processor 430 may select a transducer in accordance with a relative position of wearable audio device 400. The transducer may be selected as one or more of a private transducer (e.g., private loudspeaker, private microphone, etc.), personal transducer (e.g., personal loudspeaker, personal microphone, etc.), and/or proximal transducer (e.g., proximal loudspeaker, proximal microphone, etc.). Alternately, the transducer may be selected as one or more of a public transducer (e.g., public loudspeaker, public microphone, etc.), environmental transducer (e.g., environmental loudspeaker, environmental microphone, etc.), and/or distal transducer (e.g., distal loudspeaker, distal microphone, etc.). An audio signal (e.g., first audio signal, second audio signal, communication audio signal environmental audio signal, noise cancelling signal, masking signal, etc.) may be provided between another component of wearable audio device and the transducer in accordance with the selection. In embodiments, selecting the transducer may be performed prior to and/or independent of an audio signal being received by processor 430 and/or wearable audio device 400. Information regarding the selection may be stored, for example, in memory 470 and/or a memory integrated with processor 430 in accordance with the selection. The information may then be referenced, loaded, or otherwise used by processor 430 upon receipt of the audio signal to a transducer in accordance with the relative position of wearable audio device.

In various embodiments, wearable audio device 400 may further comprise a mount interface 480. Mount interface 480 may be physically integrated and/or coupled to housing 404 of wearable audio device 400. Mount interface 480 may be coupled on a reference surface of housing 402. In other embodiments, mount interface 480 may be integrated on a surface on a different side of housing 402 relative to the reference surface. Mount interface 480 may be mounted on a side of housing 402 opposite the reference surface and/or a side of housing 402 perpendicularly oriented relative to a side on which transducers of wearable audio device 400 are mounted. Mount interface 480 may enable wearable audio device 400 to be physically coupled to another wearable device (e.g., wearable mount 150, wearable mount 250, wearable audio device 310, etc., with brief reference to FIG. 1-3). Mount interface 480 may comprise one or more of a post, slot, receptable, latch, pin, hinge, teeth, claps, or magnet configured to securely couple to the other wearable device. In embodiments, mount interface 480 may correspond to mount interface 352 with brief reference to FIG. 3, or a mount interface of wearable audio device 110 and/or wearable audio device 210, with brief reference to FIG. 1-2.

Figure 5:
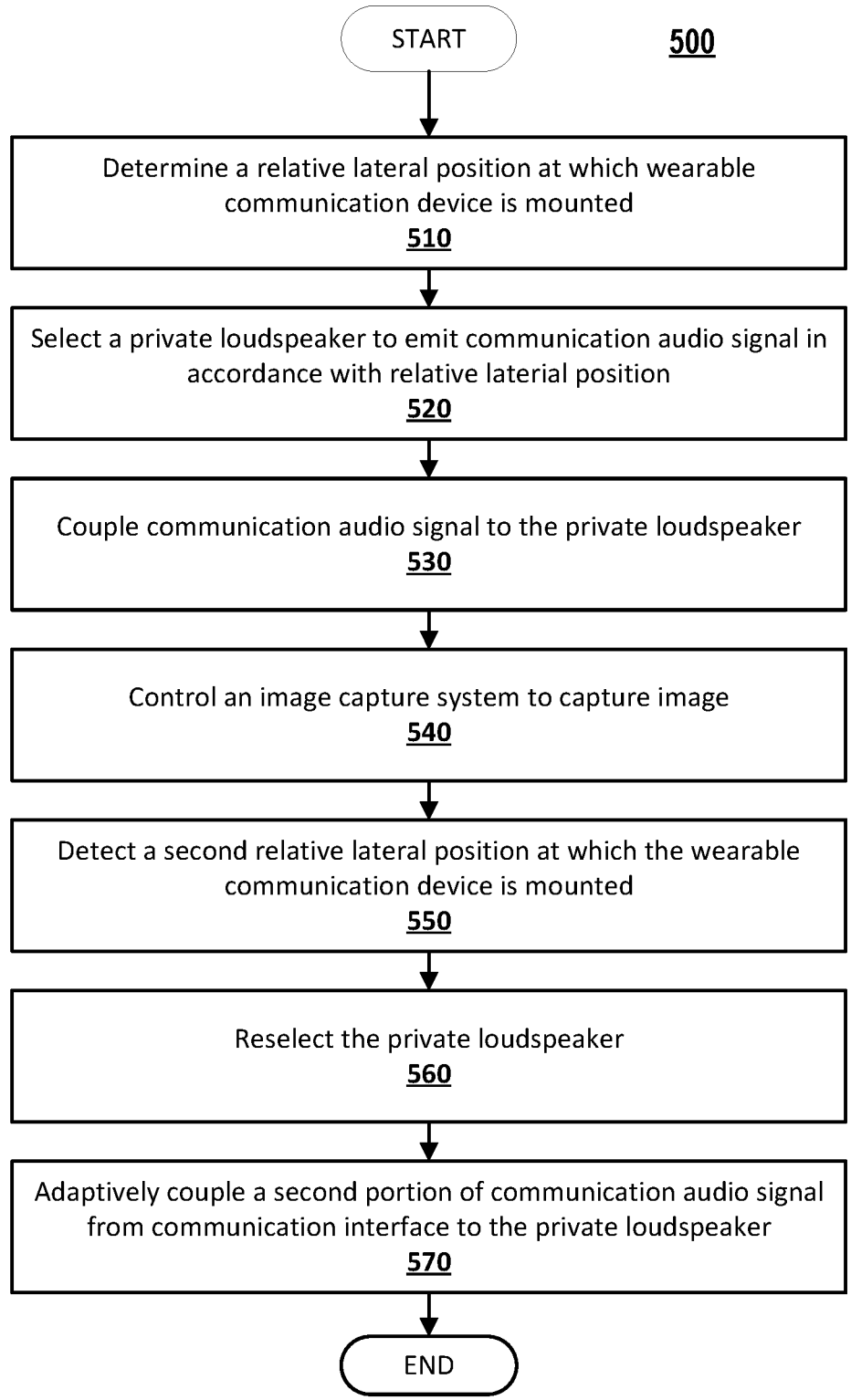
FIG. 5 illustrates a process flow for a method of providing adaptive directional audio by a wearable communication device in accordance with various embodiments.

In various embodiments, and with specific reference to FIG. 5, a method 500 for providing adaptive directional audio is disclosed. In embodiments, method 500 may be performed by a wearable audio device. In embodiments, the wearable audio device may comprise a wearable communication device. The wearable communication device may correspond to one or more of wearable audio device 110, wearable audio device 210, or wearable audio device 350, or wearable audio device 400 with brief reference to FIG. 1-4. The wearable communication device may be configured to perform one or more steps of method 500 and/or any other method or process disclosed herein. It will be appreciated that the following description makes appropriate references not only to the steps depicted in FIG. 5, but also to the various system components as described above with reference to FIGS. 1-4.

Method 500 may start upon determining (step 510) a relative lateral position at which the wearable communication device is mounted. The wearable audio device may periodically determine the relative lateral position. Alternately or additionally, wearable communication device may detect a change in state of the wearable audio device and determine the relative lateral position in accordance with the change in state. Determining the relative lateral position may comprise detecting the relative lateral position. The relative lateral position may be detected in accordance with information captured by one or more sensors and/or interfaces of the wearable communication device. Alternately or additionally, determining the relative lateral position may comprise receiving information indicative of the relative lateral position via an interface (e.g., network interface, communication interface, etc.) of the wearable communication device. The relative lateral position may be determined by a processor of the wearable communication device. The relative lateral position may include a relative lateral position along one of two lateral directions relative to a head of a user. In embodiments, the relative lateral position may be associated with one of a first side of a user and a second side of the user. The relative lateral position may comprise one of a first lateral position associated with a first ear of a user and a second lateral position associated with a second ear of the user. The second ear of the user may be obscured by a head of the user from the first lateral position. The first ear of the user may be obscured by the head of the user from the second lateral position. In embodiments, the relative lateral position may be associated with one of a left side of a user and a right side of the user. The first direction may be oriented away from a first side of a housing of the wearable communication device. The second direction may be oriented away from a second side of the housing opposite the first side. In embodiments, an angle between the first direction and the second direction may be equal or greater than thirty degrees. In embodiments, the angle between the first direction and the second direction may be equal or less than ninety degrees.

In various embodiments, the wearable communication device may select (step 520) a private loudspeaker to emit a communication audio signal in accordance with the relative lateral position. The processor (e.g., processor 430) of the wearable communication device may select the private loudspeaker. The private loudspeaker may comprise one of a first directional loudspeaker (e.g., first directional loudspeaker 410-1) configured to emit the communication audio signal in a first direction from the wearable communication device and a second directional loudspeaker (e.g., second directional loudspeaker 410-2) configured to emit the communication audio signal in a second direction from the wearable communication device. The second direction may be different from the first direction. The communication audio signal may be received via a communication interface (e.g., network interface 440) from another communication device. The one of the first directional loudspeaker and the second directional loudspeaker may be selected prior to receipt and/or independent of the communication audio signal.

In various embodiments, the wearable communication device may couple (step 530) the communication audio signal from a communication interface of the wearable communication device to the private loudspeaker in accordance with the selecting (step 520). The processor of the wearable communication device may couple the communication audio signal to the private loudspeaker in accordance with the selecting (step 520). In embodiments, the coupling may comprise excluding output of the communication audio signal from another of the first directional loudspeaker and the second loudspeaker different from the private loudspeaker.

In various embodiments, the wearable communication device may control (step 540) an image capturing system to capture an image in a third direction from the wearable communication device. The image capturing system may comprise a lens oriented in the third direction. The image capturing system may be an image capturing system of the wearable communication device. The wearable communication device may comprise a wearable recording device comprising the image capturing system. The image capturing system may be controlled by the processor of the wearable communication device. One or more images captured by the image capturing system may be recorded in a memory (e.g., memory 470). The one or more images, including the image captured in the third direction, may be stored with an audio signal captured by at least one transducer of the wearable communication device. In embodiments, one or more of a first angle between the third direction and the first direction and a second angle between the third direction and the second direction may be greater than forty-five degrees. In embodiments, one or more of a first angle between the third direction and the first direction and a second angle between the third direction and the second direction may be greater than seventy-five degrees. In embodiments, one or more of a first angle between the third direction and the first direction and a second angle between the third direction and the second direction may be greater than ninety degrees.

In various embodiments, the wearable communication device may further detect (step 550) a second relative lateral position at which the wearable communication device relative is mounted. In embodiments, detecting 550 may be performed automatically in accordance with detection performed by a sensor as discussed above with regards to determining 510. The second relative lateral position may be detected by the processor of the wearable communication device. The second relative lateral position may be different from the relative lateral position. The relative lateral position may comprise a first lateral position different from the second lateral position. The second relative lateral position may be associated with a different side of a same user. The second relative lateral position may be proximate a different side of a head of a user compared to the first lateral position. The second relative lateral position may be disposed in an opposite lateral direction relative to a midline and/or head of a user.

In various embodiments, the wearable communication device may further reselect (step 560) the private loudspeaker. The private loudspeaker may be reselected as another of the first directional loudspeaker and the second directional loudspeaker different from the one of the first directional loudspeaker and the second directional loudspeaker in accordance the detecting. The private loudspeaker may be reselected by the processor of the wearable communication device.

In various embodiments, the wearable communication device may further adaptively couple (step 570) a second portion of the communication audio signal from the communication interface of the wearable communication device to the private loudspeaker in accordance with the reselecting. The second portion may be adaptively coupled by the processor of the communication device. For example, a first directional loudspeaker (e.g., first directional loudspeaker 120-1) may be selected as the private loudspeaker and coupled to a first portion of the communication audio signal before, in accordance with the detected second relative lateral position, the private loudspeaker is reselected as a second directional loudspeaker (e.g., second directional loudspeaker 120-2) and the second directional loudspeaker is provided with the second portion of the communication audio signal. In embodiments, the first and second portions may be discontinuous portion of the communication audio signal. In embodiments, the first portion and the second portion may be received by a same communication interface (e.g., a communication interface of network interface 440).

In various embodiments, the selecting (step 520) may further comprise selecting a private microphone to receive a second communication audio signal in accordance with the relative lateral position. The private microphone may comprise one of a first microphone configured to capture the second communication audio signal in a fourth direction from the wearable communication device and a second microphone configured to capture the second communication audio signal in a fifth direction from the wearable communication device. The fourth direction may be different from the fifth direction. In embodiments, the fourth direction may be parallel the first direction associated with a first loudspeaker and/or the fifth direction may be parallel the second direction associated with a second loudspeaker. The processor of the wearable communication device may select the private microphone. One or more of the first microphone and the second microphone may comprise a respective directional microphone. The coupling (step 530) may comprise coupling the second communication audio signal to the communication interface from the private microphone. Upon reselecting (step 560), another of the first microphone and second microphone may be reselected as the private microphone, the other different from the one of the first microphone and the second microphone. The processor of the wearable communication device may reselect the private microphone.

In various embodiments, the selecting (step 520) may further comprise selecting a public microphone to receive a third audio signal in accordance with the relative lateral position. The public microphone may comprise one of a first microphone configured to capture the third audio signal in a fourth direction from the wearable communication device and
   a second microphone configured to capture the third audio signal in a fifth direction from the wearable communication device, the fourth direction different from the fifth direction. The processor of the wearable communication device may select the public microphone. One or more of the first microphone and the second microphone may comprise a respective directional microphone. The coupling (step 530) may comprise generating a cancellation audio signal in accordance with the third audio signal and coupling the cancellation audio signal to one of the private loudspeaker and another of the first directional loudspeaker and second directional loudspeaker different from the private loudspeaker. In various embodiments, audio signals captured by different microphones may be processed in different manners by a wearable audio device. For example, the selecting of the public microphone may comprise subsequently providing two audio signals from the private microphone and the public microphone to other components of a wearable audio device in different manners. In embodiments, one of the two audio signals may be provided to a communication interface. The one of the two audio signals, which may comprise a communication audio signal, may be transmitted from the wearable audio device by the communication interface. This one of the two audio signals may be captured via a first transducer (e.g., private transducer, proximate transducer, and/or personal transducer) comprising a first microphone (e.g., private microphone, proximate microphone, and/or personal microphone). The other of the two audio signals may be recorded on the wearable audio device. The other audio signal (e.g., from the public or environmental microphone), may be recorded in a memory of the wearable audio device. The other audio signal may be recorded (e.g., stored) in the memory as audio data. The other audio signal may not be provided to the communication interface with the one of the two audio signals. In embodiments, the wearable audio device may comprise a wearable camera and the other audio signal may be stored in the memory with one or more images captured via an image capturing system of the wearable camera. The other audio signal may be captured concurrently at an incident and stored with the one or more images as incident data recorded during the incident. The other audio signal may be recorded at a same time (e.g., concurrently) as the one audio data is transmitted from the wearable audio device. Accordingly, real-time audio may be communicated from a microphone directed toward a user (e.g., user 160) of a wearable audio device, while other audio may be recorded from another microphone of the same wearable audio device that is oriented toward an environment in which video data is also captured and recorded by the wearable audio device. The different directivities of the microphones may provide improved capture of relevant audio relative to subsequent processing performed on the different audio signals. For example, and with brief reference to FIG. 2, first directional transducer 220-1 may capture a communication audio signal from user 160 and second directional transducer 220-2 may capture a second, incident audio signal that is subsequently recorded in wearable audio device 200, rather than being transmitted from wearable audio device 200 with the communication audio signal. When wearable audio device 200 is determined to be positioned at first position 148-1, the communication audio signal may instead be captured by second directional transducer 220-2 and the second audio signal may be captured via first directional transducer 220-1.

In various embodiments, the selecting (step 520) may further comprise selecting a public loudspeaker to emit a fourth audio signal in accordance with the relative lateral position. The public loudspeaker may comprise another of the first directional loudspeaker and the second directional loudspeaker different from the private loudspeaker. The fourth audio signal may comprise a cancellation audio signal and/or a masking audio signal. The coupling (step 530) may comprise coupling the cancellation audio signal to the public loudspeaker. The coupling (step 530) may comprise coupling the masking audio signal to the public loudspeaker.

After adaptively coupling the second portion, method 500 may end.

Figure 6:
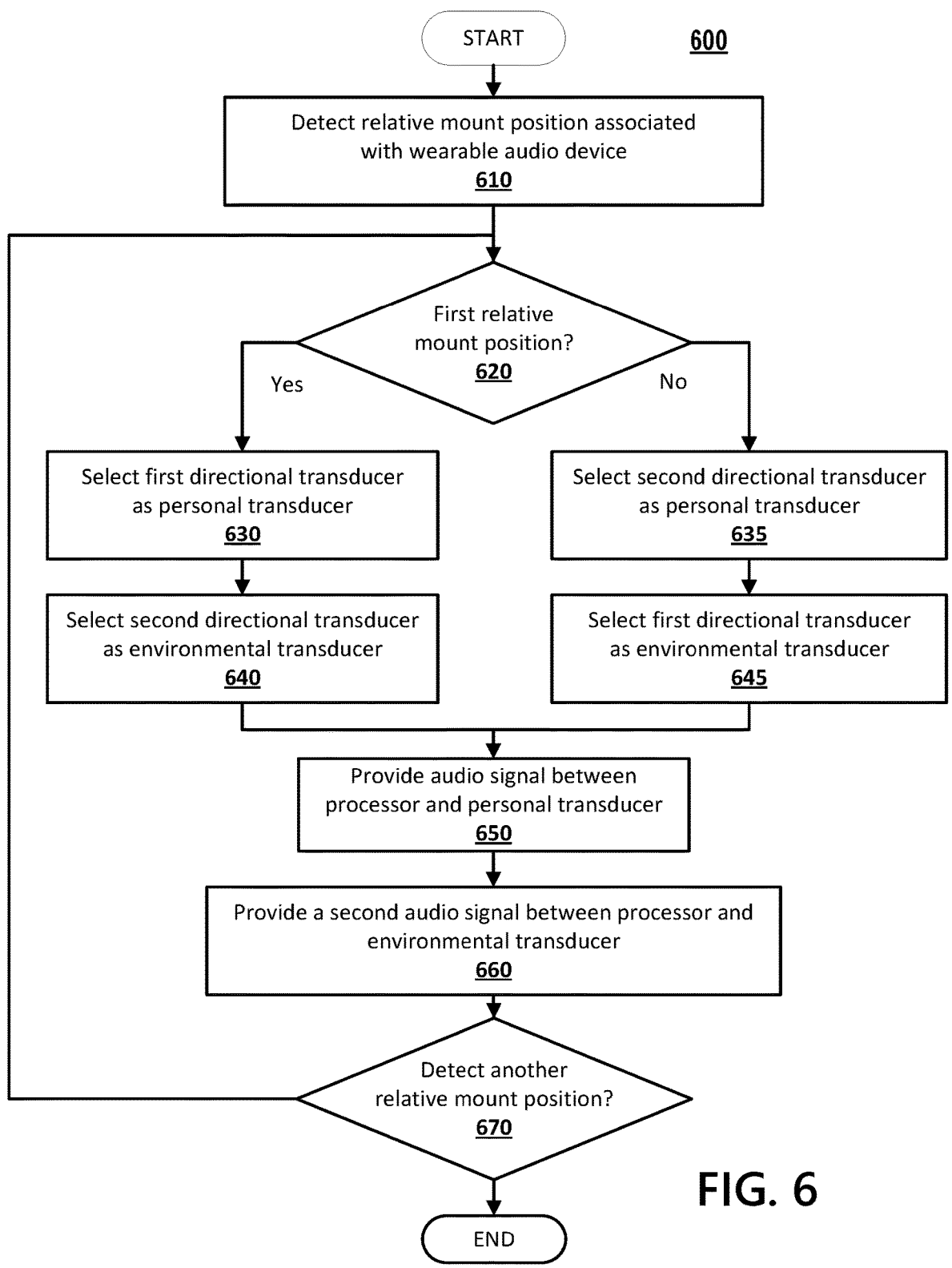
FIG. 6 illustrates a process flow for a method of providing adaptive directional audio by a wearable audio device in accordance with various embodiments of the present disclosure.

In various embodiments, and with specific reference to FIG. 6, a method 600 for providing adaptive directional audio is disclosed. In embodiments, method 600 may be performed by a wearable audio device. In embodiments, the wearable audio device may comprise one or more a wearable communication device, wearable recording device, and wearable mount. The wearable communication device may comprise one of a wearable video camera and a wearable accessory communication device configured to be coupled to a second wearable communication device. The wearable communication device may comprise the wearable accessory communication device and the second wearable communication device may comprise a land mobile radio coupled to the wearable accessory communication device.

The wearable audio device may correspond to one or more of wearable audio device 110, wearable audio device 210, or wearable audio device 350, or wearable audio device 400 with brief reference to FIG. 1-4. The wearable audio device may be configured to perform one or more steps of method 600 and/or any other method or process disclosed herein. It will be appreciated that the following description makes appropriate references not only to the steps depicted in FIG. 6, but also to the various system components as described above with reference to FIGS. 1-4.

At start, the wearable audio device may comprise a first directional transducer having a first directionality and a second directional transducer having a second directionality different from the first directionality. The wearable audio device may further comprise a processor configured to operatively control the first directional transducer and the second directional transducer. The processor may be configured to perform operations comprising one or more steps described herein.

In various embodiments, the wearable audio device may detect (step 610) one of a first relative mount position and second relative mount position associated with the wearable audio device. The one of the first relative mount position and second relative mount position may be detected by the processor. The relative mount position may be associated with one of a first side of a user and a second side of the user opposite the first side of the user.

In various embodiments, the wearable audio device may select (step 620) a personal transducer in accordance with the one of the first relative mount position and the second relative mount position. The personal transducer may comprise one of the first directional transducer and the second directional transducer. In embodiments, the first directional transducer may comprise a first directional speaker and the second directional transducer may comprise a second directional speaker, wherein the personal transducer is configured to emit the audio signal from the wearable audio device. In embodiments, only one of the first and second relative mount positions may be detected as the personal transducer at a time.

When the detected relative mount position is the first relative mount position ("Yes", step 620), the wearable audio device may select first directional transducer as a personal transducer.

When the detected relative mount position is the second relative mount position ("No", step 620), the wearable audio device may select second directional transducer as the personal transducer. In embodiments, only one of the first and second directional transducers may be selected as the personal transducer at a time.

In embodiments, the wearable audio device may select an environmental transducer in accordance with the relative mount position. The environmental transducer may comprise another of the first directional transducer and the second directional transducer different from the personal transducer. When the detected relative mount position is the first relative mount position ("Yes", step 620), the wearable audio device may select (step 640) second directional transducer as the environmental transducer. When the detected relative mount position is the second relative mount position ("No", step 620), the wearable audio device may select (step 645) first directional transducer as the environmental transducer. In embodiments, only one of the second and first directional transducers may be selected as the environmental transducer at a time.

In various embodiments, the wearable audio device may provide (step 650) an audio signal between the processor and the personal transducer. Providing the audio may comprise outputting the audio signal via the personal transducer. In embodiments, the wearable audio device may comprise a communication interface, and wherein the operations further comprise receiving the audio signal at the wearable communication device via the communication interface. The audio signal may comprise a communication audio signal. In embodiments, providing the audio signal comprises inputting the audio signal to the processor from the personal transducer. In embodiments, the first directional transducer may comprise a first microphone and the second directional transducer may comprise a second microphone, wherein the personal transducer is configured to capture the audio signal via the personal transducer. In embodiments, the processor may further transmit the audio signal from the wearable communication device via the communication interface of the wearable audio device.

In embodiments, the wearable audio device may provide (step 660) a second audio signal between the processor and the environmental transducer. The second audio signal may be different from the audio signal provided between the personal transducer and processor. In embodiments, the second audio signal may comprise a muted audio signal. In embodiments, the second audio signal may comprise one of a cancellation audio signal and a masking signal. In embodiments, the wearable device may further comprise a loudspeaker and providing the second audio signal (step 660) may comprise generating a cancellation audio signal in accordance with the second audio signal and outputting the cancellation audio signal via the loudspeaker. The personal transducer may comprise the loudspeaker. In other embodiments, wearable audio device may deactivate (e.g., decouple from an electrical signal source) the environmental transducer.

In embodiments, the wearable audio device may determine (step 670) whether another relative mount position is detected. The determining may include detecting another of the first relative mount position and the second relative mount position is associated with the wearable audio device, wherein the other of the first relative mount position and the second relative mount position is different from the one of the first relative mount position and the second relative mount position associated with the wearable audio device. When another relative mount position is not detected, method 600 may end. When another relative mount position is detected, method may repeat selecting (step 620) of the personal transducer. Upon repeating the selecting (step 620), a different directional transducer of the first directional transducer and second directional transducers of the wearable audio device may be selected as the personal transducer. The personal transducer may be reselected (e.g., step 630 instead of step 635 or step 635 instead of step 630) in accordance with the other of the first relative mount position and the second relative mount position. The wearable audio device may the further providing (e.g., step 650) the audio signal between the processor and the personal transducer after the reselecting. In embodiments, the environmental transducer may be reselected (step 640 or 645) and the second audio signal may be provided (step 660) after reselecting as well. In embodiments, the reselected personal and/or environmental transducer may comprise a different transducer of the wearable audio device relative to a previously selected personal and/or environmental transducer.

In embodiments, a wearable communication device is provided. The device may comprise a first directional loudspeaker having a first directionality. The device may comprise a second directional loudspeaker having a second directionality different from the first directionality. The device may comprise a communication interface configured to receive a communication audio signal. The device may comprise a processor configured to operatively control the first directional loudspeaker, the second directional loudspeaker, and the communication interface. The processor may be further configured to perform operations comprising one or more of detecting a relative mount position of wearable communication device; selecting a proximal loudspeaker to emit the communication audio signal in accordance with the relative mount position, wherein the proximal loudspeaker comprises one of the first directional loudspeaker and the second directional loudspeaker; and transferring the communication audio signal from the communication interface to the proximal loudspeaker in accordance with the selecting.

In various embodiments, the wearable communication device may comprise one of a mount and a body camera. In various embodiments, the first directionality may comprise a first main axis along which the first directional loudspeaker is configured to propagate a first audio signal and the second directionality may comprises a second main axis along which the second directional loudspeaker is configured to propagate a second audio signal. In various embodiments, the wearable communication device may the first directionality may comprise a first beam width along which the first directional loudspeaker is configured to propagate a first audio signal and the second directionality may comprise a second beam width along which the second directional loudspeaker is configured to propagate a second audio signal. In various embodiments, the proximal speaker may comprise the first directional loudspeaker and transferring the communication audio signal may comprise propagating the communication audio signal along one or more of the first main axis and the first beam width. In various embodiments, the proximal speaker may comprise the second directional loudspeaker and transferring the communication audio signal may comprise propagating the communication audio signal along one or more of the second main axis and the second beam width. In various embodiments, the relative mount position may comprise one of a first relative mount position associated with a first side of a head of a user; and a second relative mount position associated with a second side of the head of the user opposite the first side of the head of the user. In various embodiments, the wearable communication device may further comprise a housing comprising a reference surface, and wherein the relative mount position may comprise one of a first relative mount position and a second relative mount position, and wherein the reference surface is configured to be oriented in a reference direction in accordance with each of the first relative mount position and the second relative mount position. In various embodiments, the wearable communication may further comprise an image capturing system integrated with the reference surface and configured to capture one or more images along the reference direction.

In various embodiments, the wearable communication may further comprise a mount interface integrated with the reference surface, wherein the mount interface is configured to physically couple to a wearable camera along the reference direction.

In various embodiments, the reference direction may be spatially distinct from the first directivity and the second directivity. The reference direction may be perpendicular to one or more of a first direction associated with the first directivity and a second direction associated with the second directivity. One or more of a first angle between the reference direction and a first main axis of the first directivity and a second angle between the reference direction and a second main axis of the second directivity may be greater than forty-five degrees, greater than seventy-five degrees, or equal or greater than ninety degrees. Detecting the relative mount position may comprise detecting the relative mount position via one or more of a mount sensor, an image sensor, a video sensor, a proximity sensor, and the communication interface. The selecting may comprise selecting a distal loudspeaker in accordance with the relative mount position, wherein the distal loudspeaker may comprise another of the first directional loudspeaker and the second directional loudspeaker different from the proximal loudspeaker; and wherein transferring the communication audio signal from the communication interface to the proximal loudspeaker may comprise preventing output of the communication audio signal from the distal loudspeaker. The preventing may comprise one or more of muting the distal loudspeaker and disconnecting the distal loudspeaker from the communication interface. The preventing may comprise transferring a second audio signal to the distal loudspeaker, and wherein the second audio signal is different from the communication audio signal. The second audio signal may comprise a cancellation audio signal. In various embodiments, the wearable communication may further comprise a cancellation microphone configured to capture a third audio signal, and wherein the selecting may comprise generating the cancellation audio signal from the third audio signal. The cancellation microphone may be disposed on a side of the wearable communication device opposite the proximal loudspeaker. The cancellation microphone may comprise a first main axis along which the third audio signal is captured by the wearable communication device, and wherein the proximal loudspeaker may comprise a second main axis along which proximal loudspeaker is configured to propagate the communication audio signal from the wearable communication device, and wherein the first main axis is oriented at one of a perpendicular angle and an obtuse angle relative to the second main axis. In various embodiments, the wearable communication may further comprise a first microphone having a third directivity and a second microphone having a fourth directivity, and wherein selecting the proximal loudspeaker may comprise selecting the cancellation microphone to capture the third audio signal, and wherein the cancellation microphone may comprise one of the first microphone and the second microphone. The third directivity may be oriented in a same first direction as the first directivity and the fourth directivity is oriented in a same second direction as the second directivity. The third directivity may be spatially distinct from the second directivity and the fourth directivity is spatially distinct from the first directivity. In various embodiments, the wearable communication may further comprise a housing, wherein the first microphone and the first directional loudspeaker are disposed on a first side of the housing and the second microphone and the second directional loudspeaker are disposed on a second side of the housing opposite the first side. The housing further may comprise a reference surface between the first side and the second side. The operations may further comprise detecting a second relative mount position at which the wearable communication device relative is mounted; selecting a second proximal loudspeaker to emit the communication audio signal in accordance with the second relative mount position, wherein the second proximal loudspeaker may comprise another of the first directional loudspeaker and the second directional loudspeaker, and wherein the other of the first directional loudspeaker and the second directional loudspeaker is different from the one of the first directional loudspeaker and the second directional loudspeaker; and transferring a second portion of the communication audio signal from the communication interface to the second proximal loudspeaker, wherein the second portion of the communication audio signal is different from a first portion of the communication audio signal received by the communication interface prior to the detecting of the second relative mount position. Transferring the second portion of the communication audio signal may comprise preventing output of the second portion of the communication audio signal from the one of the first directional loudspeaker and the second directional loudspeaker.

In various embodiments, a method for providing directional audio is provided. The method may comprise one or more of determining, by a processor of a wearable communication device, a relative lateral position at which the wearable communication device relative is mounted; selecting, by the processor, a private loudspeaker to emit a communication audio signal in accordance with the relative lateral position, wherein the private loudspeaker may comprise one of: a first directional loudspeaker configured to emit the communication audio signal in a first direction from the wearable communication device; and a second directional loudspeaker configured to emit the communication audio signal in a second direction from the wearable communication device, the second direction different from the first direction; and coupling, by the processor, the communication audio signal from a communication interface of the wearable communication device to the private loudspeaker in accordance with the selecting. The relative lateral position may comprise one of a first lateral position associated with a first ear of a user and a second lateral position associated with a second ear of the user, and wherein the second ear of the user is obscured by a head of the user from the first lateral position, and wherein the first ear of the user is obscured by the head of the user from the second lateral position. The first direction may be oriented away from a first side of a housing of the wearable communication device and the second direction is oriented away from a second side of the housing opposite the first side. The coupling may comprise excluding output of the communication audio signal from another of the first directional loudspeaker and the second loudspeaker different from the private loudspeaker. An angle between the first direction and the second direction may be equal or greater than thirty degrees. The method may further comprise controlling, by the processor, an image capturing system to capture an image in a third direction from the wearable communication device. One or more of a first angle between the third direction and the first direction and a second angle between the third direction and the second direction may be greater than forty-five degrees. One or more of a first angle between the third direction and the first direction and a second angle between the third direction and the second direction may be greater than seventy-five degrees. One or more of a first angle between the third direction and the first direction and a second angle between the third direction and the second direction may be greater than ninety degrees. The method may further comprise detecting, by the processor of a wearable communication device, a second relative lateral position at which the wearable communication device relative may be mounted, wherein the second relative lateral position may be different from the relative lateral position; reselecting, by the processor, the private loudspeaker as another of the first directional loudspeaker and the second directional loudspeaker different from the one of the first directional loudspeaker and the second directional loudspeaker in accordance the detecting; and adaptively coupling, by the processor, a second portion of the communication audio signal from the communication interface of the wearable communication device to the private loudspeaker in accordance with the reselecting. The selecting may comprise selecting a private microphone to receive a second communication audio signal in accordance with the relative lateral position, wherein the private microphone may comprise one of: a first directional microphone configured to capture the second communication audio signal in a fourth direction to the wearable communication device; and a second directional microphone configured to capture the second communication audio signal in a fifth direction to the wearable communication device, the fourth direction different from the fifth direction; and wherein: the coupling may comprise coupling the second communication audio signal to the communication interface from the private microphone. The selecting may comprise selecting a public microphone to receive a third audio signal in accordance with the relative lateral position, wherein the public microphone may comprise one of: a first directional microphone configured to capture the third audio signal in a fourth direction from the wearable communication device; and a second directional microphone configured to capture the third audio signal in a fifth direction from the wearable communication device, the fourth direction different from the fifth direction; and wherein the coupling may comprise: generating a cancellation audio signal in accordance with the third audio signal; and coupling the cancellation audio signal to another of the first directional loudspeaker and second directional loudspeaker different from the private loudspeaker. The selecting may comprise selecting a public loudspeaker to emit a fourth audio signal in accordance with the relative lateral position, wherein the public loudspeaker may comprise another of the first directional loudspeaker and the second directional loudspeaker different from the private loudspeaker, and wherein the coupling may comprise coupling a cancellation audio signal to the public loudspeaker.

In embodiments, a wearable audio device is provided. The wearable audio device may comprise one or more of a first directional transducer having a first directionality; a second directional transducer having a second directionality different from the first directionality; a processor configured to operatively control the first directional transducer and the second directional transducer, wherein the processor may be further configured to perform operations that may comprise: detecting one of a first relative mount position and second relative mount position associated with the wearable audio device; selecting a personal transducer in accordance with the one of the first relative mount position and the second relative mount position, wherein the personal transducer may comprise one of the first directional transducer and the second directional transducer; and/or providing an audio signal between the processor and the personal transducer. The wearable audio device may comprise one of a mount and a wearable communication device. The wearable communication device may comprise one of a wearable video camera and a wearable accessory communication device configured to be coupled to a second wearable communication device. The wearable communication device may comprise the wearable accessory communication device and the second wearable communication device may comprise a land mobile radio coupled to the wearable accessory communication device. The relative position may be associated with one of: a first side of a user; and a second side of the user opposite the first side of the user. The first directional transducer may comprise a first directional speaker and the second directional transducer may comprise a second directional speaker, and wherein the personal transducer may be configured to emit the audio signal from the wearable audio device. Providing the audio may comprise outputting the audio signal via the personal transducer. The wearable audio device may further comprise a communication interface. The operations may further comprise receiving the audio signal at the wearable communication device via the communication interface. The selecting may comprise selecting an environmental transducer in accordance with the relative position, wherein the environmental transducer may comprise another of the first directional transducer and the second directional transducer different from the personal transducer; and wherein the operations may further comprise providing a second audio signal between the processor and the environmental transducer, and wherein the second audio signal may be different from the audio signal. The second audio signal may comprise a cancellation audio signal. The first directional transducer may comprise a first microphone and the second directional transducer may comprise a second microphone, and wherein the personal transducer may be configured to capture the audio signal via the personal transducer. Providing the audio signal may comprise inputting the audio signal to the processor from the personal transducer. In various embodiments, the wearable audio device may further comprise a communication interface, wherein the operations may further comprise transmitting the audio signal from the wearable communication device via the communication interface. The selecting may comprise selecting an environmental transducer in accordance with the relative mount position, wherein the environmental transducer may comprise another of the first directional transducer and the second directional transducer different from the personal transducer; and wherein the operations may further comprise providing a second audio signal between the processor and the environmental transducer. The wearable device may further comprise a loudspeaker, and wherein the operations may further comprise generating a cancellation audio signal in accordance with the second audio signal; an outputting the cancellation audio signal via the loudspeaker. The operations may further comprise detecting another of the first relative mount position and the second relative mount position associated with the wearable audio device, wherein the other of the first relative mount position and the second relative mount position may be different from the one of the first relative mount position and the second relative mount position associated with the wearable audio device; reselecting the personal transducer in accordance with the other of the first relative mount position and the second relative mount position; and providing the audio signal between the processor and the personal transducer after the reselecting.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, and/or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Further, where a phrase similar to "one of A and B" or "one of A or B" is used in the claims, it is intended that the phrase be interpreted to mean that A alone may be present in an embodiment or B alone may be present in an embodiment.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Examples of various exemplary embodiments embodying aspects of the invention are presented in the following example set. It will be appreciated that all the examples contained in this disclosure are given by way of explanation, and not of limitation.

The invention claimed is:
1. A wearable camera, comprising:
 a housing comprising a reference surface, the housing configured to be mounted at different positions on a user, the different positions comprising a first relative mount position and a second relative mount position different from the first relative mount position;
- a first transducer integrated with the housing, the first transducer having a first directionality;
- a second transducer integrated with the housing, the second transducer having a second directionality different from the first directionality;
- an image capturing system integrated with the reference surface, the image capturing system configured to capture an image in a reference direction away from the reference surface;
- a non-transitory, computer-readable memory configured to store the image; and
- a processor integrated in the housing and communicatively coupled to the first transducer, the second transducer, the memory, and the image capturing system to operatively control the first transducer, the second transducer, the memory, and the image capturing system, the processor configured to perform operations comprising:
  - recording the image in the memory;
  - detecting the housing is mounted to a single side of the user at one of the first relative mount position or the second relative mount position, wherein the first relative mount position is a first lateral mount position disposed toward a first side of the user and the second relative mount position is a second lateral mount position disposed toward a second side of the user opposite the first side of the user;
  - selecting one of the first transducer or the second transducer as a personal transducer in accordance with the one of the first relative mount position or the second relative mount position, wherein the personal transducer has a directionality oriented toward a head of the user in accordance with the one of the first relative mount position and the second relative mount position and the personal transducer; and
  - providing an audio signal between the processor and the personal transducer, wherein the reference direction is spatially distinct from the first directionality and the second directionality.

2. The wearable camera of claim 1, wherein the reference direction is perpendicular to one or more of a first direction associated with the first directionality and a second direction associated with the second directionality.

3. The wearable camera of claim 1, wherein the first transducer is integrated in the housing less than four inches away from the second transducer.

4. The wearable camera of claim 1, further comprising a communication interface, and wherein the operations further comprise at least one of receiving the audio signal at the wearable camera via the communication interface or transmitting the audio signal from the wearable camera via the communication interface.

5. The wearable camera of claim 1, wherein the first transducer comprises a first directional speaker and the second transducer comprises a second directional speaker, and wherein the personal transducer is configured to emit the audio signal from the wearable camera.

6. The wearable camera of claim 1, wherein the selecting comprises selecting an environmental transducer in accordance with the one of the first relative mount position or the second relative mount position, wherein the environmental transducer comprises another of the first transducer and the second transducer different from the personal transducer; and wherein the operations further comprise providing a second audio signal between the processor and the environmental transducer, and wherein the second audio signal is different from the audio signal.

7. The wearable camera of claim 6, wherein the second audio signal comprises a muted audio signal.

8. The wearable camera of claim 6, wherein the first transducer comprises a first microphone and the second transducer comprises a second microphone, and wherein the personal transducer is configured to capture the audio signal.

9. The wearable camera of claim 8, wherein providing the audio signal comprises providing the audio signal to the processor from the personal transducer independent of the environmental transducer.

10. The wearable camera of claim 8, further comprising a communication interface, and wherein the operations further comprise transmitting the audio signal from the personal transducer via the communication interface and recording the second audio signal captured by the environmental transducer in the memory with the image.

11. A method performed by a wearable camera, comprising:
- determining, by a processor of the wearable camera, a relative lateral position at which the wearable camera is mounted;
- selecting, by the processor, a private transducer of the wearable camera to emit or capture a communication audio signal in accordance with the relative lateral position, wherein the private transducer comprises one of:
  - a first directional transducer configured to emit or capture the communication audio signal in a first direction relative to the wearable camera; or
  - a second directional transducer configured to emit or capture the communication audio signal in a second direction relative to the wearable camera, the second direction different from the first direction;
- coupling, by the processor, a first portion of the communication audio signal between a communication interface of the wearable camera and the private transducer in accordance with the selecting; and
- controlling, by the processor, an image capturing system integrated with the wearable camera to capture an image in a third direction from the wearable camera, wherein a first angle between the third direction and the first direction is greater than forty-five degrees and a second angle between the third direction and the second direction is greater than forty-five degrees, and wherein determining the relative lateral position comprises determining the wearable camera is disposed toward a single side of a user that includes either a first side of the user or a second side of the user opposite the first side of the user.

12. The method of claim 11, wherein the relative lateral position comprises one of a first lateral position associated with a first ear of the user or a second lateral position associated with a second ear of the user different from the first ear, and wherein the second ear of the user is obscured by a head of the user from the first lateral position, and wherein the first ear of the user is obscured by the head of the user from the second lateral position.

13. The method of claim 11, further comprising:
- detecting, by the processor of the wearable camera, a second relative lateral position at which the wearable camera is mounted, wherein the second relative lateral position is different from the relative lateral position;
- reselecting, by the processor, the private transducer as another one of the first directional transducer or the second directional transducer different from the one of the first directional transducer or the second directional transducer in accordance with the detecting; and adaptively coupling, by the processor, a second portion of the communication audio signal between the private transducer and the communication interface in accordance with the reselecting.

14. The method of claim 11, wherein:

the private transducer comprises a private microphone configured to capture the communication audio signal;

the selecting comprises selecting one of a first directional microphone of the first directional transducer or a second directional microphone of the second directional transducer as the private microphone;

the coupling comprises coupling the first portion of the communication audio signal from the private microphone to the communication interface; and the method further comprises transmitting, by the communication interface, the first portion of the communication audio signal from the wearable camera.

15. The method of claim 14, wherein:

the selecting comprises selecting a public microphone to capture a second audio signal in accordance with the relative lateral position, wherein the public microphone comprises another one of the first directional microphone or the second directional microphone different from the one of the first directional microphone or the second directional microphone selected as the private microphone; and the method further comprises recording the second audio signal in a memory of the wearable camera with the image.

16. The method of claim 15, wherein the first portion of the communication audio signal is transmitted from the wearable camera and the second audio signal is recorded in the memory of the wearable camera at a same time.

17. A wearable communication device, comprising:

a first directional loudspeaker having a first directionality;

a second directional loudspeaker having a second directionality different from the first directionality;

a communication interface configured to receive a communication audio signal; and a processor configured to operatively control the first directional loudspeaker, the second directional loudspeaker, and the communication interface, wherein the processor is further configured to perform operations comprising:

detecting a relative mount position of the wearable communication device;

selecting a proximal loudspeaker to emit the communication audio signal in accordance with the relative mount position, wherein selecting the proximal loudspeaker comprises selecting only one of the first directional loudspeaker or the second directional loudspeaker as the proximal loudspeaker; and transferring the communication audio signal from the communication interface to the proximal loudspeaker in accordance with the selecting, wherein detecting the relative mount position comprises detecting a single side of a user toward which the wearable communication device is disposed.

18. The wearable communication device of claim 17, wherein the wearable communication device comprises one of a mount or a body camera.

19. The wearable communication device of claim 17, wherein the first directionality comprises a first main axis along which the first directional loudspeaker is configured to propagate the communication audio signal and the second directionality comprises a second main axis along which the second directional loudspeaker is configured to propagate the communication audio signal, and wherein an angle between the first main axis and the second main axis is greater than thirty degrees and less than ninety degrees.

20. The wearable communication device of claim 17, wherein the selecting comprises selecting a distal loudspeaker in accordance with the relative mount position, wherein the distal loudspeaker comprises another of the first directional loudspeaker or the second directional loudspeaker different from the proximal loudspeaker; and wherein transferring the communication audio signal from the communication interface to the proximal loudspeaker comprises preventing output of the communication audio signal from the distal loudspeaker.

* * * * *